US010859662B2

(12) United States Patent
Valencia et al.

(10) Patent No.: US 10,859,662 B2
(45) Date of Patent: Dec. 8, 2020

(54) OBJECT MONITORING SYSTEM

(71) Applicant: Commonwealth Scientific and Industrial Research Organisation, Acton (AU)

(72) Inventors: Philip Juan Valencia, Acton (AU); Nicholas Alexander Heaney, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 0 days.

(21) Appl. No.: 16/621,211

(22) PCT Filed: Feb. 21, 2019

(86) PCT No.: PCT/AU2019/050142
§ 371 (c)(1),
(2) Date: Dec. 10, 2019

(87) PCT Pub. No.: WO2019/165495
PCT Pub. Date: Sep. 6, 2019

(65) Prior Publication Data
US 2020/0191896 A1    Jun. 18, 2020

(30) Foreign Application Priority Data
Mar. 1, 2018    (AU) .............................. 2018900664

(51) Int. Cl.
*G01S 1/02*    (2010.01)
*H04W 4/30*    (2018.01)
(Continued)

(52) U.S. Cl.
CPC .......... *G01S 1/022* (2013.01); *G08B 21/0275* (2013.01); *G08C 21/00* (2013.01); *H04W 4/029* (2018.02); *H04W 4/30* (2018.02)

(58) Field of Classification Search
CPC ..... G01S 1/022; G08B 21/0275; G08C 21/00; H04W 4/029; H04W 4/30
(Continued)

(56) References Cited

U.S. PATENT DOCUMENTS 7,619,523 B2 * 11/2009 Durtschi .............. G06Q 10/087
340/572.1
8,989,053 B1    3/2015 Skaaksrud et al.
(Continued)

FOREIGN PATENT DOCUMENTS

WO    2018076058 A1    5/2018
WO    2018102861 A1    6/2018

OTHER PUBLICATIONS

International Search Report for International Application No. PCT/AU2019/050142 dated Mar. 18, 2019 (5 pages).
(Continued)

*Primary Examiner* — William Nealon
(74) *Attorney, Agent, or Firm* — Merchant & Gould P.C.

(57) ABSTRACT

An object monitoring system including a plurality of location beacons, each location beacon being configured to generate a location broadcast message indicative of a beacon location and a tag associated with a respective object in use. The includes a tag memory configured to store object rules, a tag transceiver configured to transmit or receive messages and a tag processing device configured to determine context data at least partially indicative of a tag context by at least one of determining a tag location in accordance with at least one location broadcast message received via the tag transceiver from at least one of a plurality of location beacons and using stored context data, use the object rules and the context data to identify a trigger event, determine an action associated with the trigger event and cause the action to be performed.

20 Claims, 9 Drawing Sheets

(51) Int. Cl.
  *G08B 21/02* (2006.01)
  *G08C 21/00* (2006.01)
  *H04W 4/029* (2018.01)

(58) Field of Classification Search
  USPC .................................................... 455/456.1
  See application file for complete search history.

(56) References Cited

U.S. PATENT DOCUMENTS

| | | | |
|---|---|---|---|
| 9,823,342 B2* | 11/2017 | Cook | G01S 5/0018 |
| 9,824,571 B2* | 11/2017 | Sedayao | G08B 21/0275 |
| 10,304,304 B1* | 5/2019 | Miller | G08B 13/2417 |
| 2003/0139968 A1 | 7/2003 | Ebert | |
| 2004/0008112 A1 | 1/2004 | Carrender | |
| 2006/0082444 A1 | 4/2006 | Sweeney et al. | |
| 2006/0261946 A1* | 11/2006 | Himberger | G06K 19/0723 340/572.1 |
| 2007/0112574 A1 | 5/2007 | Greene | |
| 2007/0144985 A1 | 6/2007 | Kaczmarek | |
| 2008/0157970 A1* | 7/2008 | Single | G01S 13/878 340/572.1 |
| 2008/0205886 A1 | 8/2008 | Anderson et al. | |
| 2009/0125283 A1 | 5/2009 | Conover | |
| 2010/0121668 A1 | 5/2010 | Hohmann | |
| 2011/0050423 A1 | 3/2011 | Cova et al. | |
| 2013/0198094 A1 | 8/2013 | Arazy | |
| 2013/0229263 A1 | 9/2013 | Graczyk et al. | |
| 2014/0136188 A1 | 5/2014 | Wroczynski et al. | |
| 2014/0379386 A1 | 12/2014 | Drennan, III | |
| 2015/0221052 A1 | 8/2015 | Messing | |
| 2016/0086228 A1* | 3/2016 | Babb | G06Q 30/0267 705/14.64 |
| 2016/0103823 A1 | 4/2016 | Jackson et al. | |
| 2016/0110975 A1* | 4/2016 | Oppenheimer | G06Q 10/08 340/572.1 |
| 2016/0183042 A1* | 6/2016 | Weizman | H04W 52/0209 455/456.1 |
| 2016/0212579 A1* | 7/2016 | Duan | H04W 4/023 |
| 2016/0321582 A1 | 11/2016 | Broudou et al. | |
| 2016/0350359 A1 | 12/2016 | Kim et al. | |
| 2016/0352778 A1 | 12/2016 | Chari et al. | |
| 2017/0012813 A1 | 1/2017 | Skaaksrud et al. | |
| 2017/0041452 A1* | 2/2017 | Amann | H04W 4/33 |
| 2017/0046945 A1* | 2/2017 | Englot | G08B 29/18 |
| 2017/0060574 A1 | 3/2017 | Malladi et al. | |

OTHER PUBLICATIONS

Ovadia. "Automate the Internet with "If This Then That" (IFTTT)" Behavioral & Social Sciences Librarian, vol. 33, pp. 208-211, (2014).

* cited by examiner

OBJECT MONITORING SYSTEM

This application is a National Stage Application of PCT/AU2019/050142, filed 21 Feb. 2019, which claims benefit of Serial No. 2018900664, filed 1 Mar. 2018 in Australia and which applications are incorporated herein by reference. To the extent appropriate, a claim of priority is made to each of the above disclosed applications.

BACKGROUND OF THE INVENTION

The present invention relates to a system and method for monitoring objects, and in one particular example, to a system and method for monitoring objects based on an object context to ensure compliance with associated rules.

DESCRIPTION OF THE PRIOR ART

The reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavour to which this specification relates.

Particularly in the context of occupational health and safety, there are a large number of rules regarding the way in which objects should operate, be handled, used or maintained. For example, in many situations there are restrictions on movement of hazardous objects, such as gas bottles, or robots, precluding these being used in certain environments, such as in enclosed buildings, in the vicinity of people, or the like. Furthermore, there are often requirements for equipment to be inspected on a regular basis to ensure it is operating in a correct manner.

In many cases, there are a large number of different rules governing different objects, making it difficult for users to ensure they are compliant when using, handling or otherwise interacting with objects. Furthermore, whilst there is some degree of uniformity over such rules, there can also be significant differences, for example with different organisations implementing their own internal rules, meaning it can be extremely difficult for visitors or casual workers to ensure compliance.

Despite this, compliance is important to ensure safety of workers, and failure to ensure compliance can lead to accidents and significant liabilities, making this of utmost commercial importance.

Current approaches to compliance monitoring typically involve education and training programs, used in conjunction with oversight, such as regular monitoring of worker activities by a supervisor. However, these approaches are not always successful.

US2017/046945 describes a gas detector (102) with a Bluetooth low energy (BLE) communicator. An auditor device with a BLE communicator is provided. An advertisement packet is broadcasted by the gas detector when the gas detector is non-compliant with predefined standards, in which the advertisement packet has non-compliance information. The advertisement packet is received by the auditor device from the gas detector, and the non-compliant gas detector is indicated by the auditor device. The non-compliance information of the advertisement packet is displayed by the auditor device.

Whilst this therefore describes a system suitable for monitoring compliance of a gas detector, this is of limited value in that it only operates in one very particular scenario.

U.S. Pat. No. 9,824,571 describes an apparatus that alerts based on a distance between items. The apparatus includes a radio for communicating with an internet of things (IoT) tag on an item. A locator module determines a distance between two or more items, and an alertor module alerts a user to a violation of a proximity rule.

Whilst this therefore describes a system capable of proximity monitoring, this system is restricted to proximity monitoring, and is therefore only able to operate in one particular scenario.

In addition to ensure compliance with rules, monitoring of objects can also be used for a wide range of other scenarios. However again, suitable techniques for object monitoring are typically limited, and are often overtly complex and expensive.

SUMMARY OF THE PRESENT INVENTION

In one broad form, an aspect of the present invention seeks to provide an object monitoring system including: a plurality of location beacons, each location beacon being configured to generate a location broadcast message indicative of a beacon location; a tag associated with a respective object in use, wherein the tag includes: a tag memory configured to store object rules; a tag transceiver configured to transmit or receive messages; a tag processing device configured to: determine context data at least partially indicative of a tag context by at least one of: determining a tag location in accordance with at least one location broadcast message received via the tag transceiver from at least one of a plurality of location beacons; and, using stored context data; use the object rules and the context data to identify a trigger event; determine an action associated with the trigger event; and, cause the action to be performed.

In one embodiment the system includes: a repository storing object rules for a plurality of object types; a client device that communicates with the tag and the repository, and wherein in use object rules are uploaded from the repository to the tag using the client device based on an object type of the respective object.

In one broad form, an aspect of the present invention seeks to provide an object monitoring system including: a repository storing object rules for a plurality of object types; a tag associated with a respective object in use, the tag including: a tag memory configured to store object rules; a tag transceiver configured to transmit or receive messages; and, a tag processing device; and, a client device that communicates with the tag and the repository, and wherein in use: object rules are uploaded from the repository to the tag using the client device based on an object type of the respective object; and, the tag processing device is configured to: determine context data at least partially indicative of a current tag context; use the object rules and the context data to identify a trigger event; determine an action associated with the trigger event; and, cause the action to be performed.

In one embodiment the system includes a plurality of location beacons, each location beacon being configured to generate a location broadcast message indicative of a beacon location and wherein the tag processing device is configured to determine context data in accordance with at least one location broadcast message received via the tag transceiver from at least one of the plurality of location beacons.

In one embodiment the object rules are uploaded to the tag via one or more of the plurality of location beacons.

In one embodiment the client device includes at least one of: one or more computer systems; one or more smart phones; one or more tablets; and, one or more mobile computing devices.

In one embodiment the tag processing device is configured to determine the context data using at least one of: a received message, including at least one of: a broadcast message from another tag; a client device message from a client device; sensor data from at least one sensor; user input commands; and, stored context data.

In one embodiment the tag memory is configured to store stored context data.

In one embodiment the stored context data is indicative of at least one of: an object history; an action history; a trigger history; a tag movement; one or more measured parameters; and, an elapsed time period.

In one embodiment the tag processing device is configured to update stored context data in accordance with at least one of: an identified trigger; an action performed; and, user input commands.

In one embodiment the object rules are stored in the tag memory as code, and wherein the tag processing device is configured to execute the code to identify if a trigger event has occurred.

In one embodiment the code includes a plurality of code snippets, each snippet corresponding to a respective object rule.

In one embodiment the tag processing device is configured to repeatedly execute the plurality of code snippets.

In one embodiment the tag includes an object identifier indicative of at least an object type of the associated objected.

In one embodiment the object identifier includes: a first identifier indicative of an object category; and, a second identifier indicative of an object sub-category.

In one embodiment the tag periodically transmits a broadcast message indicative of at least one of: an object type identifier; a tag location; measured parameters; and, context data.

In one embodiment the tag broadcast message includes a data packet including: a packet header containing the object type identifier; and, a payload containing the tag location.

In one embodiment the tag: compares the tag location to location restrictions defined in the object rules for the respective object; and, identifies a trigger event if the tag location breaches the location restrictions.

In one embodiment a first tag: determines a proximity of a second object using a broadcast message transmitted by a second tag associated with the second object; compares the proximity to proximity restrictions for the first and second objects defined in the object rules for the first object; and, identifies a trigger event if the proximity breaches the proximity restrictions.

In one embodiment a first tag: uses a broadcast message received from a second tag associated with a second object to determine a second tag location indicative of a location of the second tag; and, determines a proximity of the second object using the second tag location and a first tag location.

In one embodiment a first tag: determines a second tag context using a broadcast message transmitted by a second tag associated with the second object; determines a mutual context using the second tag context and a first tag context; and, identifies a trigger event if the mutual context breaches the mutual context restrictions.

In one embodiment a client device: determines a selected object type in accordance with user input commands; and, generates a notification indicative of the tag location when a tag broadcast message having an object identifier of the selected object type is received.

In one embodiment a broadcast message is indicative of an object rule version, and wherein the tag processing device: compares an object rule version from a received broadcast message to an object rule version of the uploaded object rules; and, identifies a trigger event depending on a result of the comparison.

In one embodiment the tag: uses sensor data from at least one sensor to determine a measured parameter value; and, identifies a trigger event if the measured parameter value breaches parameter value restrictions.

In one embodiment the at least one sensor includes at least one of: a temperature sensor; a pressure sensor; a humidity sensor; and, a radiation sensor.

In one embodiment at least one of: a tag message is transferred to a client device via a location beacon; and, a client device message is transferred to a tag via a location beacon.

In one embodiment the tag processing device is configured to: select a communication slot associated with a location beacon; and, transmit the action message to the location beacon via the selected communication slot.

In one embodiment the tag processing device is configured to: transmit an advert broadcast message advertising selection of the communication slot; receive advert broadcast messages transmitted by other tags; use received advert broadcast messages to determine if a conflict exists; and, transmit the action message to the location beacon via the selected communication slot if a conflict does not exist.

In one embodiment the action includes at least one of: using a tag output device to at least one of: at least partially control equipment; at least partially control the object; and, generate a notification; and, transferring an action message to a client device, the client device being responsive to the action message to at least one of: generate a notification; perform an action; forward the action message to a defined destination; and, cause an event log to be updated.

In one embodiment the client device: compares the action message to action settings; and, selectively performs an action in accordance with the action settings.

In one embodiment the client device: determines a tag identifier from the action message; generates a confirmation message; and, transfers the confirmation message to the tag in accordance with the tag identifier, and wherein the tag is responsive to the confirmation message to update the context data.

In one embodiment the tag includes an output device including at least one of: an audio output; a light source; and, a signal generator.

In one embodiment the action includes at least one of: alerting a user to a rule breach; notifying a user of required maintenance; deactivating the object; and, causing a transaction to be performed.

In one embodiment the tag: repeatedly transmits broadcast messages separated by a transmission interval; and, repeatedly listens for a message over a listening interval greater than the transmission interval.

In one embodiment the tag: wakes from a sleep mode; determines if a trigger event has occurred; and, if a trigger event has not occurred, returns to the sleep mode.

In one embodiment the tag is configured to wake from a sleep mode, at least one of: in response to sensing of movement using a movement sensor; and, periodically.

In one embodiment the tag includes at least one of: a power supply; an output device; and, at least one sensor.

In one embodiment a client device uploads object rules to a tag by: determining a tag identifier associated with the tag; determining an object type in accordance with user input commands; retrieving object rules for the respective object type from the rules repository; and, uploading the object rules to the tag in accordance with the tag identifier.

In one embodiment the client device: displays a list of object types obtained from the object rules; and determines selection of one of the list of object types.

In one embodiment the client device determines the tag identifier at least one of: in accordance with user input commands; from a broadcast message received from the tag; and, by scanning coded data displayed on the tag.

In one embodiment the system includes a rules engine, and wherein the rules engine: receives a rules document; parses the rules document using natural language processing to identify: logic expressions; and, object types; determines an object identifier for each object type; and, generates object rules for each object using the logic expressions.

In one embodiment the rules engine at least one of: retrieves an object identifier for an object based on an object type of the object; and, generates the object identifier.

In one embodiment the rules engine generates the rules by converting the logic expressions to a trigger event and action.

In one embodiment the rules engine: retrieves a rule template from a template repository; and, populates the rule template to generate an object rule. A tag for use in an object monitoring system, the tag being associated with a respective object in use and including: a tag memory configured to store object rules; a tag transceiver configured to transmit or receive messages; a tag processing device configured to: determine context data at least partially indicative of a tag context by at least one of: determining a tag location in accordance with at least one location broadcast message received via the tag transceiver from at least one of the plurality of location beacons; and, using stored context data; use the object rules and the context data to identify a trigger event; determine an action associated with the trigger event; and, cause the action to be performed.

In one broad form, an aspect of the present invention seeks to provide a method for use in an object monitoring system, the object monitoring system including: a plurality of location beacons, each location beacon being configured to generate a location broadcast message indicative of a beacon location; a tag associated with a respective object in use, wherein the tag includes: a tag memory configured to store object rules; a tag transceiver configured to transmit or receive messages; and, a tag processing device, the method including, in the tag processing device: determining context data at least partially indicative of a tag context by at least one of: determining a tag location in accordance with at least one location broadcast message received via the tag transceiver from at least one of a plurality of location beacons; and, using stored context data; using the object rules and the context data to identify a trigger event; determining an action associated with the trigger event; and, causing the action to be performed.

In one broad form, an aspect of the present invention seeks to provide a computer program product for use in an object monitoring system including: a plurality of location beacons, each location beacon being configured to generate a location broadcast message indicative of a beacon location; a tag associated with a respective object in use, wherein the tag includes: a tag memory configured to store object rules; a tag transceiver configured to transmit or receive messages; and, a tag processing device, the computer program product including computer executable code that when executed by the tag processing device, causes the tag processing device to: determine context data at least partially indicative of a tag context by at least one of: determining a tag location in accordance with at least one location broadcast message received via the tag transceiver from at least one of the plurality of location beacons; and, using stored context data; use the object rules and the context data to identify a trigger event; determine an action associated with the trigger event; and, cause the action to be performed.

In one broad form, an aspect of the present invention seeks to provide an object monitoring method including: providing a repository storing object rules for a plurality of object types; providing a tag associated with a respective object in use; using a client device that communicates with the tag and the repository to upload object rules from the repository to the tag using the client device based on an object type of the respective object; and, using the tag to: determine context data at least partially indicative of a current tag context; use the object rules and the context data to identify a trigger event; determine an action associated with the trigger event; and, cause the action to be performed.

In one broad form, an aspect of the present invention seeks to provide an object monitoring system including a tag associated with a respective object in use, wherein the tag: receives object rules uploaded from a repository to the tag using the client device, the object rules being based on an object type of the respective object; determines context data at least partially indicative of a current tag context; uses the object rules and the context data to identify a trigger event; determines an action associated with the trigger event; and, causes the action to be performed.

In one broad form, an aspect of the present invention seeks to provide an object monitoring method including, in a tag associated with a respective object in use: receiving object rules uploaded from a repository to the tag using the client device, the object rules being based on an object type of the respective object; determining context data at least partially indicative of a current tag context; using the object rules and the context data to identify a trigger event; determining an action associated with the trigger event; and, causing the action to be performed.

In one broad form, an aspect of the present invention seeks to provide an object monitoring system including a client device that communicates with a tag associated with a respective object in use and a repository storing object rules for a plurality of object types, and wherein in use the client device operates in accordance with software instructions stored in memory to: upload object rules from the repository to the tag based on an object type of the respective object, and wherein the tag is responsive to determine context data at least partially indicative of a current tag context; use the object rules and the context data to identify a trigger event; and, determine an action associated with the trigger event; and, cause an action to be performed.

In one broad form, an aspect of the present invention seeks to provide an object monitoring method including, in a client device that communicates with a tag associated with a respective object in use and a repository storing object rules for a plurality of object types, the client device operating in accordance with software instructions stored in memory, and the method including: uploading object rules from the repository to the tag based on an object type of the respective object, and wherein the tag is responsive to determine context data at least partially indicative of a current tag context; use the object rules and the context data to identify a trigger event; and, determine an action associated with the trigger event; and, causing an action to be performed.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which:—

DETAILED DESCRIPTION OF THE PREFERRED EMBODIMENTS

Figure 1:
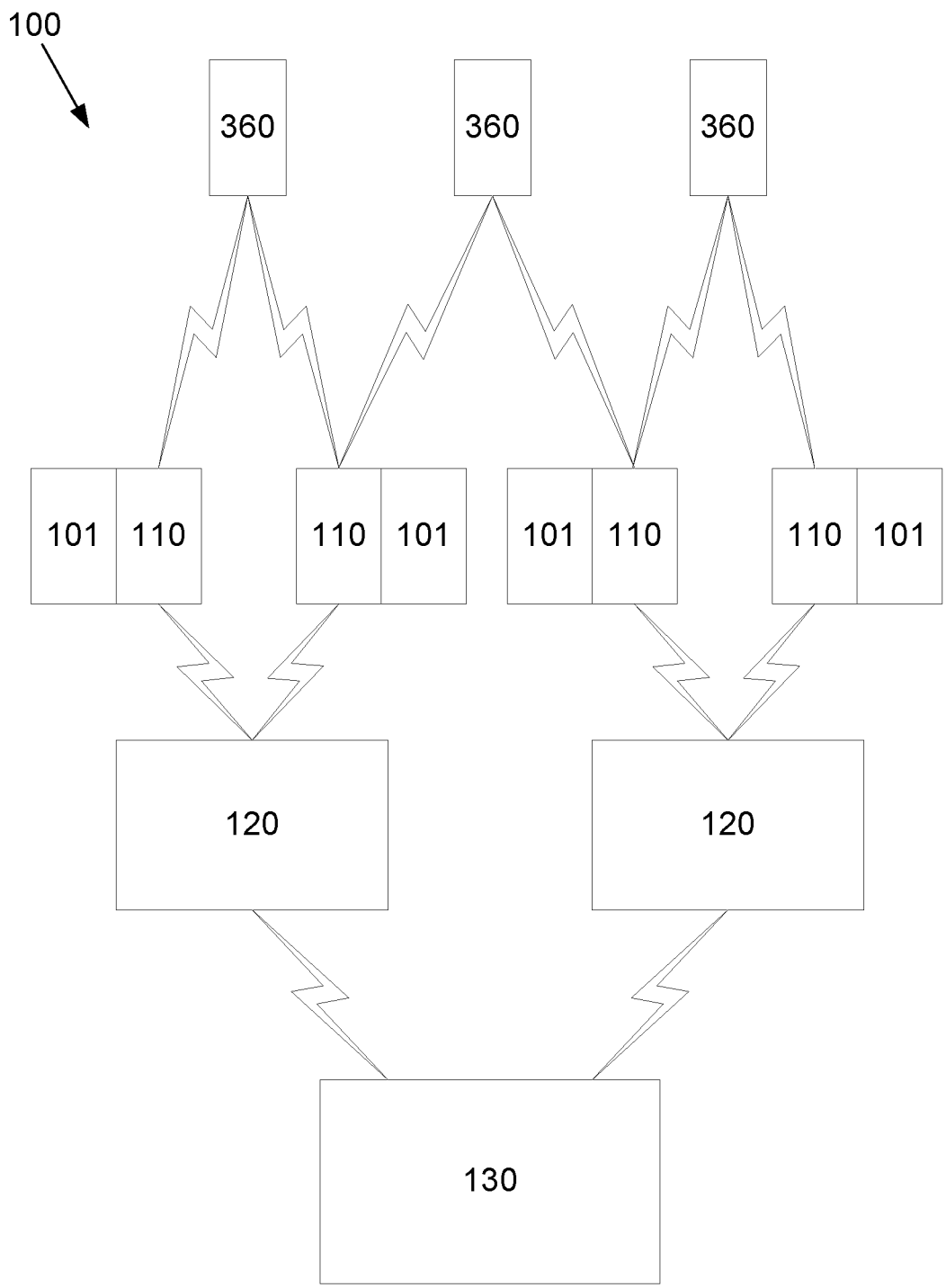
FIG. 1 is a schematic diagram of an example of an object monitoring system.

An example of an object monitoring system will now be described with reference to FIG. 1.

In this example, the system includes one or more tags 110, each of which is associated with a respective object 101 in use. The tags 110 are electronic tags 110 that are capable of communicating utilising a short range wireless communication protocol such as Bluetooth, Bluetooth Low Energy (BLE) or the like. The tags 110 are typically associated with an object 101 by having the tag 110 attached to or integrated into the object 101 in some manner, depending on the physical form factor of the tag 110 and the object 101. This is performed so that the tag 110 is generally provided in the same environment as the object, and has a similar context to the object, such as the same physical location and optionally is subject to similar conditions, such as levels of temperature, humidity or the like.

Whilst the tags can have any form, typically the tags include components, such as a tag memory configured to store object rules, a tag transceiver configured to transmit or receive messages and a tag processing device configured to perform any required operations. The components could be of any appropriate form, and could include volatile and/or non-volatile memory and a short range wireless transceiver, such as a Bluetooth transceiver. The processing device could be any electronic processing device such as a microprocessor, microchip processor, logic gate configuration, firmware optionally associated with implementing logic such as an FPGA (Field Programmable Gate Array), or any other electronic device, system or arrangement. For ease of illustration the remaining description will refer to a processing device, but it will be appreciated that multiple processing devices could be used, with processing distributed between the processing devices as needed, and that reference to the singular encompasses the plural arrangement and vice versa.

One or more location beacons 160 can be provided, which in one example are configured to periodically generate a location broadcast message indicative of a beacon location, which is transmitted via a short range wireless communication protocol, such as Bluetooth, Bluetooth Low Energy (BLE), or the like. The location broadcast messages can be received by devices, such as the tags 110, allowing the tag to determine a location. The location beacon can be of any appropriate form, and could include iBeacons™, or other similar devices. The configuration of such beacons is known in the art and will not therefore be described in any further detail, although it will be noted that in one example these can have a configuration similar to the tags 110, which are described in more detail below.

One or more client devices 120 are typically provided that communicate with the tags 110 and a repository 130, which stores object rules for a plurality of different types of object. The client devices 120 can be adapted to communicate with the tags 110 either directly using a short range wireless communication protocol, or via intermediate networks or devices, such as the location beacons, as will be described in more detail below. The client devices 120 can also communicate with the repository via one or more communications networks, such as the Internet, local area networks, wide area networks, or the like. Accordingly, the client devices 120 could be of any appropriate form and in one particular example could include one or more of processing systems, computer systems, smart phones, tablets, mobile computing devices, or the like. Different types of client devices might be provided, and in one example, the client devices can include a combination of portable communication devices, such as mobile phones, as well as cloud based or other network based computer systems, such as servers, or similar. Client devices could also include custom hardware devices specifically configured to provide notifications, such as audible and/or visual alerts, or similar. The repository could also be of any suitable form, and could include a database or other similar data store, optionally coupled to a processing system, such as a computer system, server, or the like, which provides onward connectivity to the repository.

Figure 2:
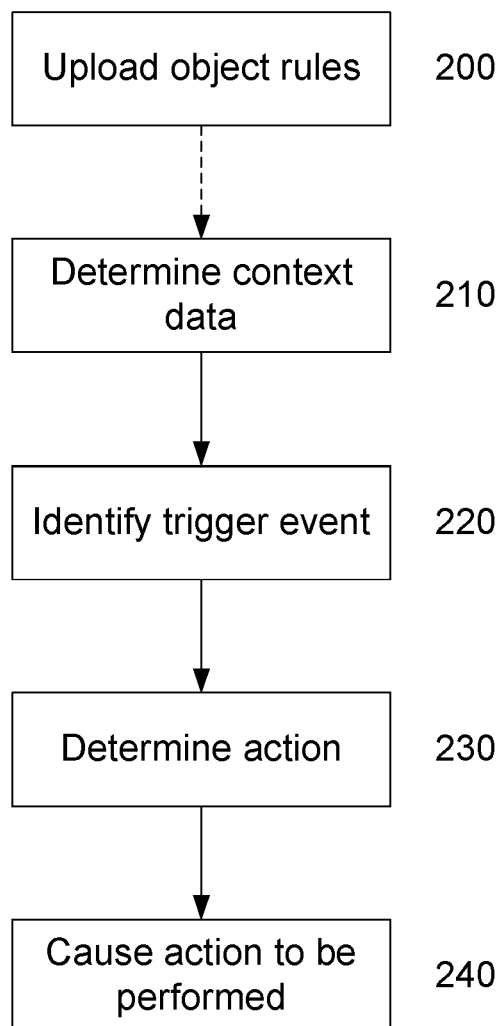
FIG. 2 is a flow chart of an example of an object monitoring process.
Figure 3:
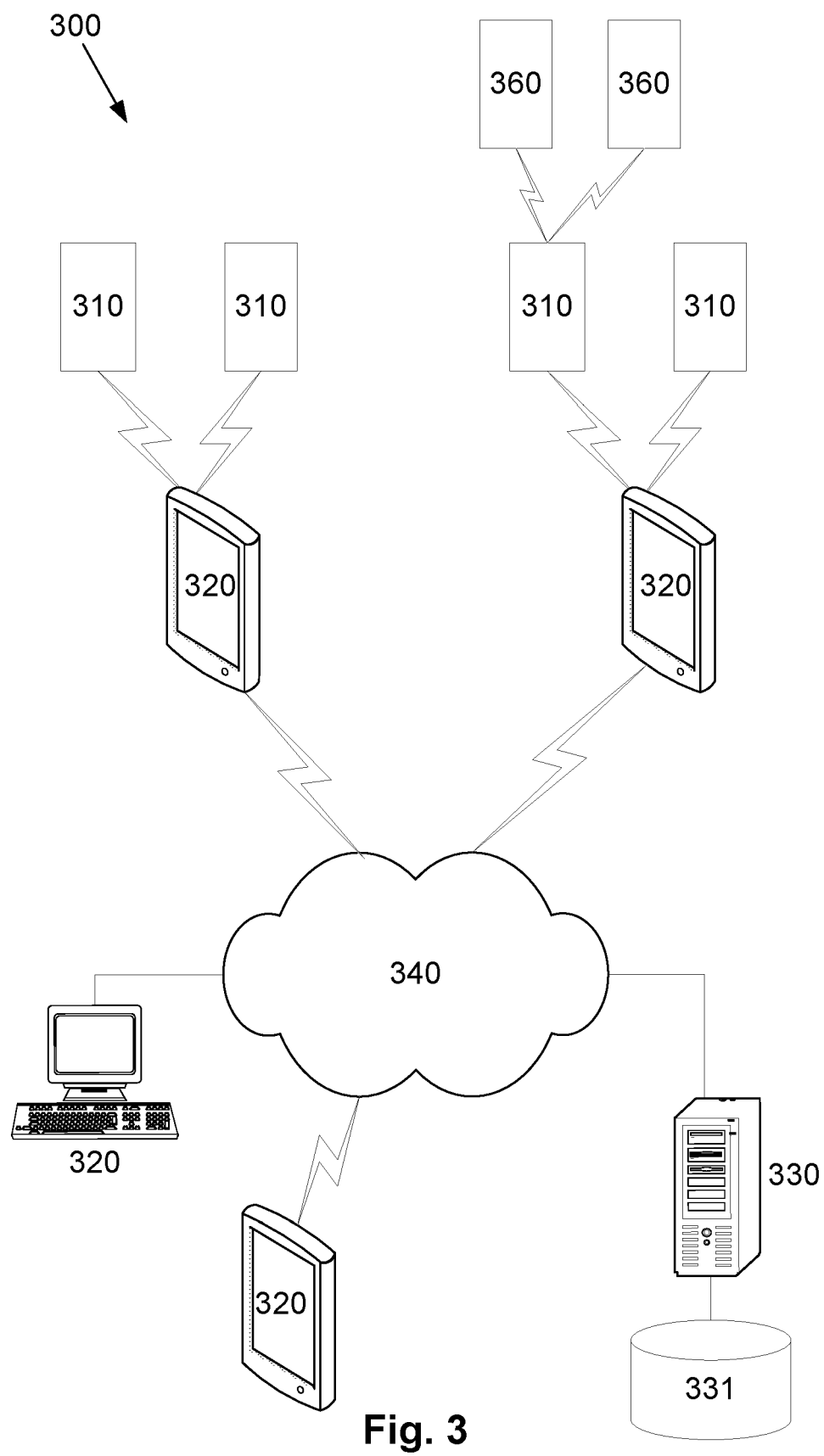
FIG. 3 is a schematic diagram of a specific example of an object monitoring system.

Example of processes for object monitoring using the above described system will now be described with reference to FIG. 2.

In one example, at step 200, the client device 120 is used to upload object rules from the repository 130 to the tag 110. This is performed based on an object type of the respective object 101 with which the tag 110 is associated, so that the tag 110 is populated with object rules appropriate to the respective object 101. Thus, the rules uploaded to the tag 110 will be different for objects 101 that are to be treated differently, so that, for example, the rules uploaded to a tag associated with a hydrogen gas bottle, may differ to those uploaded to a tag associated with an oxygen gas bottle. It will be noted that the rules may also be specific to a particular context, so that for example, different rules may apply in different facilities, depending on differences in rules for the different facilities.

Thus, in this example, the client devices 120 can be used to upload object rules to the tags. In this regard, it will be appreciated that uploading of object rules is typically performed as a one off process when the tag 110 is initially associated with a respective object, with the rules optionally being updated as needed, for example in the event of a change in compliance requirements. However, alternatively, tags could be populated with object rules in other manners. For example, predefined tags 110 could be provided, which are prepopulated with object rules specific to a particular object, with the user then selecting to attach a tag 110 to an object 101 depending on the type of object 101 and the object rules uploaded on the particular tag 110.

In use, at step 210, the tag 110 determines context data at least partially indicative of a current tag context. The context data can be of a range of different forms and may be obtained from a number of different sources. For example, the context data could correspond to one or more sensed parameters, such as a temperature, humidity, pressure, or the like. In one example, however, the context data is at least partially based on messages received by the tag 110 from one or more external devices, and in particular location messages broadcast by the location beacons 110, allowing the tag processing device to determine a tag location.

Additionally and/or alternatively, context data can be based on stored context data, which in one example is stored in the tag memory. The stored context data can be used to store any form of context data, such as previous sensor readings, previous trigger events that have been identified, previous actions that have been performed, previous input commands received, or the like. Additionally and/or alternatively the stored context data can correspond to defined parameters, or the like, which can be used in interpreting the object rules, for example to define threshold values against which measured values are compared.

In further alternatives, context data can also be based on tag messages received from other tags 110, or messages received from client devices 120, as will be described in more detail below.

At step 220, the object rules and context data are used by the tag 110 to identify a trigger event. A trigger event will typically arise when certain conditions or other criteria specified within the object rules are met or not met, depending on the nature of the rules. For example, an object 101 may have a permitted area of use, in which case the tag 110 can compare a current tag location to the permitted use area and identify a trigger event if the tag 110 is outside the permitted use area. Similarly, the rules could define exclusion zones, with a trigger event occurring if the tag 110 is located within the exclusion zone. Thus, it will be appreciated that in this example, the absolute position of the object and hence tag, is used independent of any other tags, in order to determine when an event occurs.

Alternatively, in the case of the context data including stored context data, this could include examining previously stored context information, such as a previously measured sensor reading, or action performed, in order to determine when an event occurs, with this again being capable of being performed independently of any other tags. By way of example, the stored context data could include an indication of when a device last underwent maintenance or compliance checking, with this being used to identify an event when schedule follow-up maintenance or compliance checking is due.

In any event, it will be appreciated that, comparison of the context data to the object rules is used to identify if a trigger event has occurred. It will be appreciated from this that a wide range of different trigger events could be defined with the scope of these largely being restricted only by the nature of the context data available to the tag 110. A number of further example trigger events will be described in more detail below.

At step 230, the tag 110 operates to determine an action associated with the trigger event using the object rules, allowing the tag 110 to cause the action to be implemented at step 240. The action is typically specified as part of the object rules and will depend on the particular trigger event that has been identified. Thus, it will be appreciated that the object rules will typically define a number of different trigger events, together with an associated action for each trigger event.

The nature of the action and the manner in which this is implemented will vary depending on the particular circumstances and the preferred implementation. For example, the action could include generating an alert or notification locally on the tag, using an output device, or similar. Alternatively, the action could be performed remotely, by transferring an action message to a third party device, such as the client device, or one or more other processing systems, either directly, or via the location beacons, allowing these to cause the action to be performed. In the context of compliance monitoring, actions would typically include generating notifications for users, supervisors, or other individuals, recording or logging of the trigger events, and optionally initiating safety overrides, such as shutting down of equipment. However, in this or other contexts, a wide range of different actions could be implemented, such as causing transactions to be performed, or the like, as will be described in more detail below.

Accordingly, in one broad form, the above described system and process utilises a repository storing object rules for a plurality of object types, with the object rules being uploaded onto a tag 110 based on an object type of the respective object 101 with which the tag 110 is associated.

In another broad form, once object rules are stored on the tag 110, the tag 110 can monitor context data to determine a tag 110 context, utilising this information together with the object rules in order to identify trigger events. Once a trigger event has been identified, an action associated with that trigger event can be initiated.

In one particular arrangement, the above described system is utilised in order to perform compliance monitoring, thereby ensuring interaction with, or use of, objects 101 occurs in appropriate manner. Particular examples of this include monitoring locations of objects, including locations relative to other objects, to ensure restrictions are not breached, as well as monitoring environmental conditions to which objects 101 are exposed. However, this is not intended to be limiting and the techniques can be applied in a wide variety of circumstances, for example to perform object tracking, or the like.

Once a trigger has been identified, an action can be initiated, such as generating an alert or other notification, allowing a user to understand that a compliance rule has been breached or is about to be breached, and allowing them to take mitigating action, such as by moving the object, as well as allowing breaches or potential breaches to be recorded for logging purposes. Actions can be performed manually, in response to a notification provided to a user or other individual, or could be automated, for example having the tag deactivate a robot or vehicle in the event it enters an area containing people.

A number of further features will now be described.

As previously mentioned, context data can be of any appropriate form and can be determined in any one of a number of ways, depending on the preferred implementation. In one example, the context data is determined using a received message, which can be a broadcast message received from another tag, a location broadcast message received from a location beacon or a client device message received from a client device 120. A broadcast message received from another tag 110 can be used to allow the tag 110 to determine a proximity or movement of another tag, and hence a relative proximity or movement of two objects, whilst an absolute or relative location within an environment can be determined using the location broadcast message, for example to determine if the tag is within a set distance of a location beacon.

The context data could also be determined using sensor data obtained from one or more sensors, located on-board or in communication with the tag 110. The sensor data typically relates to one or more sensed parameters, such as a temperature sensed by a temperature sensor, a humidity sensed by a humidity sensor, a pressure sensed by a pressure sensor, or radiation, such as visible or non-visible electromagnetic radiation, sensed by a radiation sensor. It will be appreciated however that other sensors could be provided and that the listed sensors are for the purpose of illustration only and are not intended to preclude the use of other sensors.

The context data could also be indicative of historical events, including an object history, such as previous locations or movement of the object, a previous proximity to other objects, details of use of the object, an elapsed time since actions were performed, details of maintenance actions, or the like. The historical events could also include an action history, a trigger history, or the like. It will be appreciated that this allows triggers to be based on historical or cumulative effects, and not just the immediate context of the tag 110. Finally, the context data can be determined based on messages received from a client device, for example allowing the context data to be determined based on user input commands, enabling user interaction with the tags. Using combinations of different types of context data can enable a wide range of complex monitoring to be performed, and examples of this will be described in further detail below.

In one example, the trigger event relates to the location of the tag 110. Whilst the location of the tag 110 could be determined utilising an on-board location system, such as GPS, or the like, typically this is energy intensive and accordingly, a preferred arrangement is the utilisation of location beacons, as previously described. In this instance, the tag 110 receives a location broadcast message from at least one location beacon and uses the location broadcast message to determine a tag location. The tag location could be defined relative to the beacon, for example specifying that the tag 110 is within a certain range of the beacon. More typically however, the tag 110 operates to receive location broadcast messages from multiple beacons, allowing it to triangulate its position within an environment based on the beacons that can be detected. In this instance, the tag location could be defined based on a relative position to the beacons, or could be interpreted on-board the tag 110 using a location beacon map forming part of the object rules, to allow an absolute location within an environment to be determined. Alternatively, the location broadcast message could include coordinates of each location beacon, optionally defined during a beacon configuration process, allowing the tag 110 to determine a location based on these coordinates. It will be appreciated that as the object rules might be defined for a local venue, such as a facility or site of an organisation, this can allow the location to be defined using a coordinate system specific to that locale, or using a global coordinate system, such as a longitude and latitude, depending on the preferred implementation.

In addition to the location beacons being used to allow the tags to determine their location, the location beacons can be leveraged to provide a communication pathway to other devices. In this regard, in one example, the location beacons are network enabled, allowing these to be coupled to one or more communications networks, such as Wi-Fi networks, or the like. In this instance, the location beacons can then be utilised in order to route communications to and/or from the tags. For example, this allows a remote client device, such as a computer system, smart phone, tablet, or the like, to transfer messages to the tags, for example to upload object rules to the tags, or to receive messages, such as action messages, from the tags.

In this instance, communication could be achieved in any suitable manner. For example, in the event that object rules are to be uploaded to a particular tag, the object rules can be forwarded to one or more of the location beacons, together with a tag identifier of the particular tag. The location beacons can then broadcast a communication request using the tag identifier, and then wait for a response. A response might be received by one or more of the beacons, in which case the beacons can communicate to select one of the beacons, which then forwards the object rules to the tag. Alternatively, the object rules could be broadcast by each of the location beacons.

It will be appreciated that whilst communication can be performed with specific tags based on tag specific identifiers, alternatively this could be performed with tags associated with particular types of objects, using object type identifiers. In this regard, in one example, the tag includes an object identifier indicative of at least an object type of the associated object. This allows an object type of the object associated with the tag to be easily identified, for example allowing messages to be transferred to all tags associated with a particular type of object.

In one preferred example, the object identifier includes a first identifier indicative of an object category and a second identifier indicative of an object sub-category, which allows a wide range of object types to be defined using a minimal number of bytes. This in turn allows the object identifier to be broadcast as part of a message packet header, allowing object types to be identified from packet headers, without requiring a packet payload to be analysed. This reduces computational requirements, allowing tags and other hardware to only analyse the content of relevant data packets, and also enables the transfer of information to be achieved without requiring devices to undergo Bluetooth pairing.

In one example, in order to minimise the data that is required to configure a tag, the object rules are stored in the tag memory as code, with the tag processing device being configured to execute the code to identify if a trigger event has occurred. In one particular example, the code includes a plurality of code snippets, each snippet corresponding to a respective object rule. Thus, each object rule is embodied as a respective snippet of executable code, which typically allows the object rule to be expressed using a minimal number of bytes. This, in turn, allows the object rules to be uploaded as packetized code, having a minimal volume, thereby minimising bandwidth and resulting memory requirements. Additionally, this allows the tag processing device to be configured to repeatedly execute the plurality of code snippets and thereby efficiently process the context data to identify trigger events.

As mentioned above, in one example, a message, such as a client device message or messages containing object rules, can be transferred to a tag via a location beacon. Similarly, tag messages, such as action messages, or the like, can be transferred to a client device, via a location beacon. In this instance, location beacons are typically configured to receive transmissions in predetermined communication slots, a set amount of time after transmitting location broadcast messages, as part of a normal communication protocol, for example to allow the location beacons to receive responses from the tags. In this instance, the tags can transmit messages to the location beacons during these slots, so that the messages can be subsequently routed to other devices, as needed. To achieve this, a tag processing device will select a communication slot associated with a location beacon and then transmit the message to the location beacon via the selected communication slot.

In one example, the number of communication slots available for each beacon is limited, meaning this can cause collisions if multiple tags attempt to communicate simultaneously. To avoid collisions, each tag processing device is configured to transmit an advert broadcast message advertising the tag processing device's selection of the communication slot. Simultaneously, the tag processing device operates to receive advert broadcast messages transmitted by other tags and use received advert broadcast messages to determine if a conflict exists. If no conflict exists, transmission can occur via the selected communication slot. Otherwise conflict resolution is typically performed, for example by having each advert broadcast message seeded with a random number, with the tag having the highest number communicate, and other tags communicate in subsequent cycles.

It will therefore be appreciated that the above arrangement allows the location beacons to operate to provide two-way communication channels with the tags. This enables communication with remote devices, such as computer systems or similar, without requiring that the devices communicate directly with the tags. This is particularly useful as this allows the system to be utilised without requiring client devices local to the tags. For example, this allows remote computer systems to communicate with the tags via back-end channels provided by the location beacons, without requiring additional local infrastructure and without requiring the tags to be provided with network access.

Upon determining a location, the tag processing device is configured to compare the tag location to location restrictions defined in the object rules for the respective object, and then identify a trigger event if the tag location breaches or is likely to breach the location restrictions. Thus, for example, the object rules could define locations where the object 101 is permitted, with a trigger event being identified if the tag location falls outside the list of permitted tag locations, or is approaching a boundary of a permitted location. Conversely, the location restrictions could define locations where the object 101 is not allowed, with the trigger event being identified if the tag location moves into a location that is not permitted, or approaches a location where the tag is not permitted. A similar approach, using historical location information, could be used to determine tag movement, with this being used to determine if object movement, such as speed, falls within permitted or restricted ranges.

Typically, each tag 110 periodically transmits a broadcast message indicative of at least an object type identifier of the associated object. This allows nearby tags 110 to identify other objects 101 within their vicinity. In particular, a first tag 110 can determine a proximity of a second object 101 using a broadcast message transmitted by a second tag 110 associated with the second object. In this instance, the first tag 110 can compare the proximity to proximity restrictions defined for the first and second objects 101 in the object rules for the first object, identifying the trigger event if the proximity breaches the proximity restrictions. Thus, for example, hydrogen and oxygen gas bottles may not be allowed to be stored within a set distance, such as ten metres, of each other. In this instance, if a first tag 110 on a hydrogen gas bottle detects a second tag 110 associated with an oxygen gas bottle, the hydrogen gas bottle will determine the proximity and determine if this is within the set distance specified in the object rules, if so triggering an action, such as generating an audible and/or visual alert. Thus, it will be appreciated that the object rules for the first tag can be populated with rules defining set proximities to other objects, and that the tags of those other objects will have similar object rules defined in respect of the first object. Accordingly, as both tags 110 are transmitting broadcast messages, the second tag 110 will also determine the presence of the first tag 110 in proximity of the second tag 110, and perform a similar process, thereby also triggering an action. The proximity could be defined in terms of a set distance, and could also include a buffer zone in addition to the proximity, so that an alert can be generated when the buffer zone is reached, thereby alerting users that a proximity is about to be breached.

The proximity could be determined solely based on a transmission range of the tags, so that if a broadcast message is received, this indicates that the objects are within a defined proximity restriction. However, generally this is of only limited accuracy as transmission ranges of the tags 110 will vary depending environmental factors, such as the presence of obstructions, or the like. Accordingly, more typically the broadcast message is indicative of a tag location, in which case the first tag 110 uses the broadcast message received from the second tag 110 to determine the second tag location, determining the proximity of the second object 101 using the second tag location and the first tag location.

The broadcast messages may also include other context data allowing a similar approach to be used more broadly to establish a mutual context, with this being used to determine if the mutual context breaches mutual context rules. For example, the relative movement of two objects could be used to identify if the two objects are going to collide, allowing an action to be determined in the event that this is to occur.

In one particular example, the tag periodically transmits a broadcast message indicative of an object type identifier, a tag location and optionally, one or more measured parameters and/or other context data. In this instance, the broadcast message can include a data packet including a packet header containing the object type identifier and a payload containing the tag location and optionally other information, such as the parameters and/or other context data.

It will be appreciated that in a similar manner a client device 120 can be used to detect the presence of tags 110 in the vicinity of the client device 120, by having the client device 120 receive the tag broadcast messages. This can facilitate the process of having a user find objects. For example, if the user needs to find a particular type of object, such as a gas bottle, the user can select an object type using a user interface presented on the client device 120. The client device 120 can then monitor for tag broadcast messages containing the object identifier corresponding to the selected type of object and generate a notification once this is received. This allows a user to traverse an area, with a notification being generated once the relevant object is within a transmission range of the client device 120. Additionally, as the tag broadcast message also typically includes a tag location, this can be used to display an indication of the location of the object to the user.

It will be appreciated that in the above examples, the tags only need the ability to transmit broadcast messages including an object identifier and location, and receive broadcast messages from other tags, as well as location messages from location beacons, whilst still allowing significant complex monitoring operations to be performed. In particular, this allows absolute and relative location or movement monitoring, as well as proximity monitoring to be performed, while not requiring any additional sensing modalities. This is particularly beneficial as such operation can be achieved using low power requirements, which in turn allows the tags to maintain a small foot print, whilst maintaining a long life span. This enables the tags to be attached to a wide range of objects without unduly impacting on the appearance or functionality of the object, and remain in place for long periods of time, such as several months or years, without requiring attention.

A further benefit of the above arrangement is that the data that needs to be contained within the message can be minimal. For example, depending on the number of objects defined within the object rules, the object identifier could be a few bits in length, whilst the location could also be specified using a relatively small number of bits, depending on the particular coordinate system used within the local environment. This allows the object identifier and location to be included in a field of a broadcast message, allowing this information to be exchanged without requiring pairing of the tags 110, or the tag 110 and the client device 120.

It will be appreciated that the longevity of tag operation can cause issues. Particularly in the case of compliance monitoring, it is typical for compliance rules, and hence the object rules to change within time frames shorter than the life span of the tags. As the tag object rules would not necessarily be updated unless a client device is actively used, this could mean that tags are operating in accordance with different versions of the object rules. To address this, the broadcast message can also be indicative of an object rule version. In this instance, a tag 110 can compare an object rule version from a received broadcast message to a currently uploaded object rule version, identifying a trigger result if the current rules are out of date. This can be used to prompt an update of the object rules on the tag 110.

As previously mentioned, in addition to performing monitoring solely on the basis of the locations of the tags, the tags 110 can also make use of sensor data from at least one sensor to determine a measured parameter value. This can then be used to determine a trigger event, for example if the measured value breaches parameter value restrictions. Thus, for example, it may be a breach in compliance to store a gas bottle in an environment where the temperature exceeds a set temperature threshold. In this instance, the tag 110 can use temperature data received from a temperature sensor in order to determine a current environmental temperature. The tag 110 can compare this to a temperature threshold defined in the object rules, causing an alert to be generated if the temperature exceeds the threshold. It will be appreciated that the temperature threshold could additionally and/or alternatively form part of the stored context data. In this instance, the temperature could be a previously recorded temperature, so that if a certain temperature change is detected, an alert could be generated.

In one example, the tag 110 retrieves stored context data and determines a trigger depending on the stored context data. The stored context data can be used to store any form of context data, such as previous sensor readings, previous trigger events that have been identified, previous actions that have been performed, previous input commands received or the like. This enables the tag 110 to maintain a historical record, which in turn can allow more complex behaviour to be implemented. For example, this could be used in order to determine a length of time for which a temperature has been above a threshold, thereby allowing an alert to be triggered in the event that a temperature or other parameter exceeds a threshold for a set time period. This could also be used to monitor cumulative thresholds, such as a cumulative exposure to ionising radiation.

Additionally, context data could be updated in accordance with user input commands, received from a client device 120 using a client device message. This could be performed for example to allow details of maintenance performed on the object 101 to be recorded. It will be appreciated that this can therefore be used in conjunction with stored context data to monitor a time period between maintenance actions to ensure a maintenance schedule is met.

Whilst a wide range of different actions could be implemented using the system, in a preferred example, the action includes one or both of tag based or non-tag based actions. Examples of tag based actions include using a tag 110 output device to generate a notification, such as using an audio output device, such as a speaker, to generate one or more sounds or spoken phrases, or using a light source to generate a visible indication. Additionally, the output device could be adapted to partially control equipment or the object, for example using a signal generator to generate a control signal, which can applied to a suitable control signal input of the equipment or object.

Non-tag based actions can be triggered by transferring an action message to a remote device, such as the client device 120. In this instance, the client device 120 can be responsive to the action message to generate a notification, such as an audible or visual indication, perform an action, such as forwarding the action message to a defined destination, such as an email address, SMS address, or a third party processing system, or causing an event log to be updated. It will be appreciated that through passing of messages to further external devices, this can be used to trigger any form of automated or manual process, for example instructing a number of maintenance staff that maintenance needs to be performed on a particular device. In this regard, if the client device 120 is able to forward a message to any processing system, the message can be routed to maintenance staff irrespective or not of whether they are in the vicinity of the tag 110, and/or have access to a client device 120 themselves.

In one example, the client device 120 is adapted to compare an action message to action settings and then selectively perform an action in accordance with the action settings. In this regard, it will be appreciated that in an environment where there are a large number of tags 110, individuals may not wish or be required to respond to all notifications. In this instance, their client device 120 can be configured to block notifications based on local settings, including blocking specific types of messages or actions, or blocking actions or messages associated with particular object types. However, appropriate configuration could be used to still allow the client device 120 to forward action messages to a defined destination, as required, thereby ensuring the action is performed, but avoiding unnecessarily disturbing the user of the client device 120.

Additionally the tag 110 may be required to understand when an action has been completed, for example to update the stored context data, and prevent duplication of actions by multiple client devices 120. In this instance, a client device 120 performing an action typically determines a tag identifier from the received action message, generates a confirmation message, and transfers the confirmation message to the tag 110 in accordance with the tag identifier, allowing the tag 110 to update context data, for example to reflect that the action has been performed, has commenced or is in progress.

It will be appreciated from this that each tag 110 can have a respective identifier, which is unique to the respective tag 110, allowing messages to be directed to the tag. In this instance, the confirmation message will typically be broadcast to any tags 110 in the vicinity of the client device 120, with tags 110 ignoring messages including a tag identifier corresponding to a different tag 110. This allows two-way communication to be established between a client device 120 and tag 110, without requiring a Bluetooth pairing process to be performed. This avoids the need for users to pair their client device 120 with multiple tags in order for the system to operate.

It will be appreciated from the above that a wide range of different actions can be performed, and that consequently the actions can be used for a wide range of applications. For example, in the context of compliance monitoring, typical actions include alerting users to a rule breach, recording details of rule breaches for logging purposes, notifying users of required actions associated with objects, such as required maintenance or the like, implementing safety overrides, such as deactivating objects 101 or equipment, or the like.

However, this is not essential and the system could be used in a wide range of other applications. For example, actions could include causing a transaction to be performed. An example of this is in the context of delivery of objects to a defined destination. In this instance, tags 110 attached to the objects could be pre-programmed, using suitable object rules, to identify when a destination location is reached, either based on the location of the tag, or based on the proximity to a destination tag. In this instance, once the destination location is reached, the action could include notifying devices that the destination has been reached, and optionally triggering a transaction, such as completion of a delivery order, payment for the delivery, completion of a delivery contract, or the like.

The above described processes rely at least to some extent on tags 110 being able to communicate with other tags 110 and with client devices 120. As such communication can be energy intensive, in one preferred example, the tags 110 repeatedly transmit broadcast messages separated by a transmission interval. Such transmission is typically trivial from an energy usage perspective, and hence this could be repeated constantly with a relatively high frequency, such as every second. In contrast, listening for messages such as location, tag, or client device messages, and then processing these as required, is typically more energy intensive.

Accordingly, the system is typically configured to repeatedly listen for messages over listening interval that is greater than the transmission interval, with this being interspersed with time periods in which the tag is in a low-power sleep mode, in which listening does not occur. Configuring the system so that the listen interval is longer than the transmission interval ensures that tag messages from other tags will be received each time the tag wakes. For example, if tags 110 transmit with a defined transmission interval such as one second, then listening for a message over a two second listening interval will ensure that at least one broadcast message transmitted by any other tag 110 that is within range will be received.

In this example, the tag 110 typically wakes from a sleep mode periodically, such as every minute, every two minutes, every ten minutes or every fifteen minutes, or the like, depending on relevant settings, or in response to detection of movement, for example based on signals from a movement sensor, such an accelerometer. In this regard, waking on movement is particularly beneficial as location restrictions will typically arise primarily when an object is being moved. Upon waking, the tag processing device listens for a message, determines if a trigger event has occurred and then returns to the sleep mode if this has not happened, thereby conserving power.

In order to upload object rules to a tag, the client device typically needs to determine a tag identifier associated with a tag. This can be achieved in any one of a number of ways, such as obtaining tag identifiers from tags within range of the client device to allow a user to select a tag identifier, based on user input commands for example by having a user manually input a tag identifier, or by scanning coded data, such as a QR code or similar displayed on the tag. Having determined a tag identifier, the client device will then determine available object types in accordance with user input commands, for example by displaying a list of object types obtained from object rules and then determining selection of one or more of the listed object types. Once an object type has been determined, rules can be retrieved for the respective object type from the rules repository, with these then being uploaded to the tag in accordance with the tag identifier.

The object rules can be generated in any suitable manner. In one example, this includes using a rules engine to at least partially automate the task. The rules engine typically operates by receiving a rules document, and parsing using natural language processing, to identify logic expressions and object types. An object identifier is then determined for each object type, either by retrieving these based on an object type of the object or by generating these as needed. The logic expressions are then used to generate the object rules by converting the logic expressions into a trigger event and an action, before uploading these to the tag. For example, the logic expressions are often specified within a rules text in terms of "If . . . then . . . " statements, which can be converted to a trigger and action. This can be performed using templates, for example by populating a template using text from the "If . . . then . . . " statements, so that the rules are generated in a standard manner, allowing these to be interpreted consistently by the tags.

A specific example of an object monitoring system will now be described in more detail with reference to FIGS. 3 to 6.

In this example, the tracking system includes a plurality of tags 310, which in use are attached to objects (not shown). A number of client devices 320 are provided, with some of these being in communication with the tags 310. A processing system 330, such as one or more servers, is provided in communication with the client devices 320 via one or more communications networks 340.

It will be appreciated that the configuration of the networks 340 are for the purpose of example only, and in practice the client devices 320 and the processing system 330 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like. Typically the client devices 320 are configured to communicate with the tags 310 using a short range communication protocol, such as BLE, or the like.

A number of location beacons 360 are also typically provided, distributed throughout the location in which the tags 310 are used, with the location beacons being adapted to transmit location messages via the same short range communication protocol.

Whilst the processing system 330 is shown as a single entity, it will be appreciated that in practice the processing system 330 can be distributed over a number of geographically separate locations, for example as part of a cloud based environment. However, the above described arrangement is not essential and other suitable configurations could be used.

Figure 4:
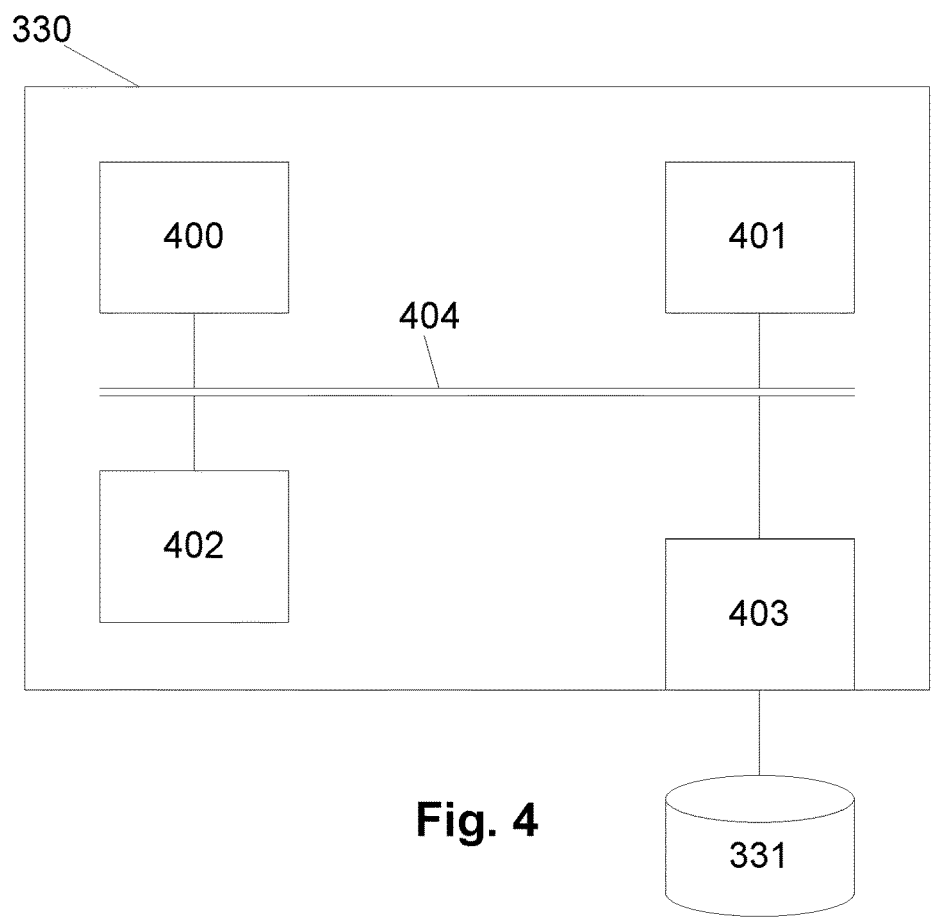
FIG. 4 is as schematic diagram of an example of a processing system.

An example of a suitable processing system 330 is shown in FIG. 4. In this example, the processing system 330 includes at least one microprocessor 400, a memory 401, an optional input/output device 402, such as a keyboard and/or display, and an external interface 403, interconnected via a bus 404 as shown. In this example the external interface 403 can be utilised for connecting the processing system 330 to peripheral devices, such as the communications networks 340, databases, other storage devices, or the like. Although a single external interface 403 is shown, this is for the purpose of example only, and in practice multiple interfaces using various methods (e.g. Ethernet, serial, USB, wireless or the like) may be provided.

In use, the microprocessor 400 executes instructions in the form of applications software stored in the memory 401 to allow the required processes to be performed. The applications software may include one or more software modules, and may be executed in a suitable execution environment, such as an operating system environment, or the like.

Accordingly, it will be appreciated that the processing system 330 may be formed from any suitable processing system, such as a suitably programmed client device, PC, web server, network server, or the like. In one particular example, the processing system 330 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 5:
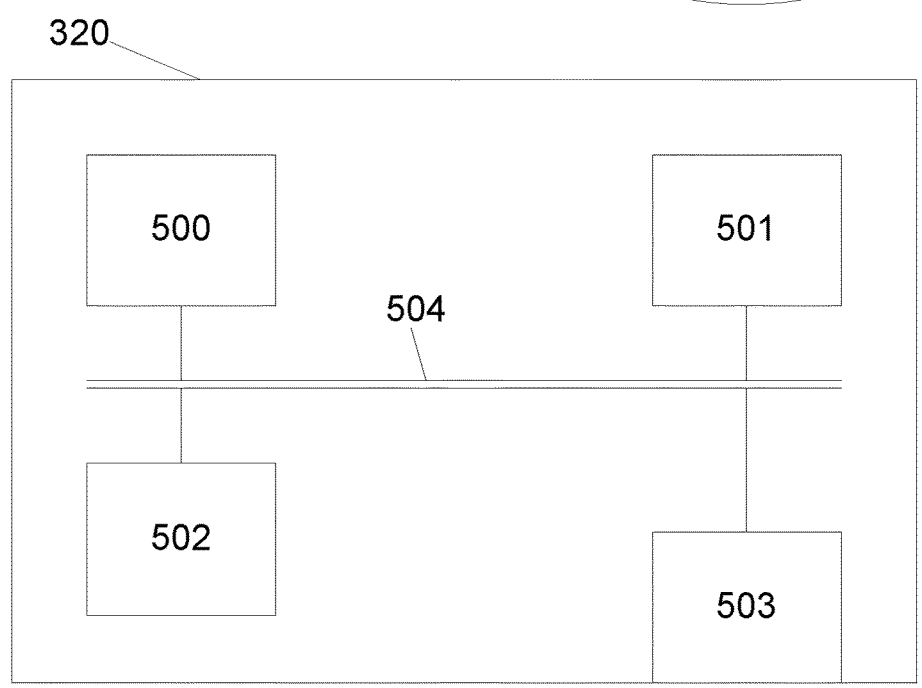
FIG. 5 is a schematic diagram of an example of a client device.

As shown in FIG. 5, in one example, the client device 320 includes at least one microprocessor 500, a memory 501, an input/output device 502, such as a keyboard and/or display, and an external interface 503, interconnected via a bus 504 as shown. In this example the external interface 503 can be utilised for connecting the client device 320 to peripheral devices, such as the tags 310, the communications networks 340, databases, other storage devices, or the like. Although a single external interface 503 is shown, this is for the purpose of example only, and in practice multiple interfaces using various methods (e.g. Ethernet, serial, USB, wireless or the like) may be provided.

In use, the microprocessor 500 executes instructions in the form of applications software stored in the memory 501 to allow for communication with the tags 310, the processing systems 330, as well as to allow user interaction for example through a suitable user interface.

Accordingly, it will be appreciated that the client devices 320 may be formed from any suitable processing system, such as a suitably programmed PC, Internet terminal, laptop, or hand-held PC, and in one preferred example is either a tablet, or smart phone, or the like. Thus, in one example, the client device 320 is a standard processing system such as an Intel Architecture based processing system, which executes software applications stored on non-volatile (e.g., hard disk) storage, although this is not essential. However, it will also be understood that the client devices 320 can be any electronic processing device such as a microprocessor, microchip processor, logic gate configuration, firmware optionally associated with implementing logic such as an FPGA (Field Programmable Gate Array), or any other electronic device, system or arrangement.

For the purpose of the following examples, it is assumed that one or more processing systems 330 are servers, which communicate with the client devices 320 via a communications network, or the like, depending on the particular network infrastructure available. The servers 330 typically execute applications software for performing required tasks including storing, searching and processing of data, with actions performed by the servers 330 being performed by the processor 400 in accordance with instructions stored as applications software in the memory 401 and/or input commands received from a user via the 110 device 402, or commands received from the client device 320.

It will also be assumed that the user interacts with the client device 320 via a GUI (Graphical User Interface), or the like presented on a display of the client device 320, and in one particular example via a browser application that displays webpages, or an App that displays relevant information. Actions performed by the client devices 320 are performed by the processor 500 in accordance with instructions stored as applications software in the memory 501 and/or input commands received from a user via the 110 device 502.

However, it will be appreciated that the above described configuration assumed for the purpose of the following examples is not essential, and numerous other configurations may be used. It will also be appreciated that the partitioning of functionality between the client devices 320, and the servers 330 may vary, depending on the particular implementation.

Figure 6:
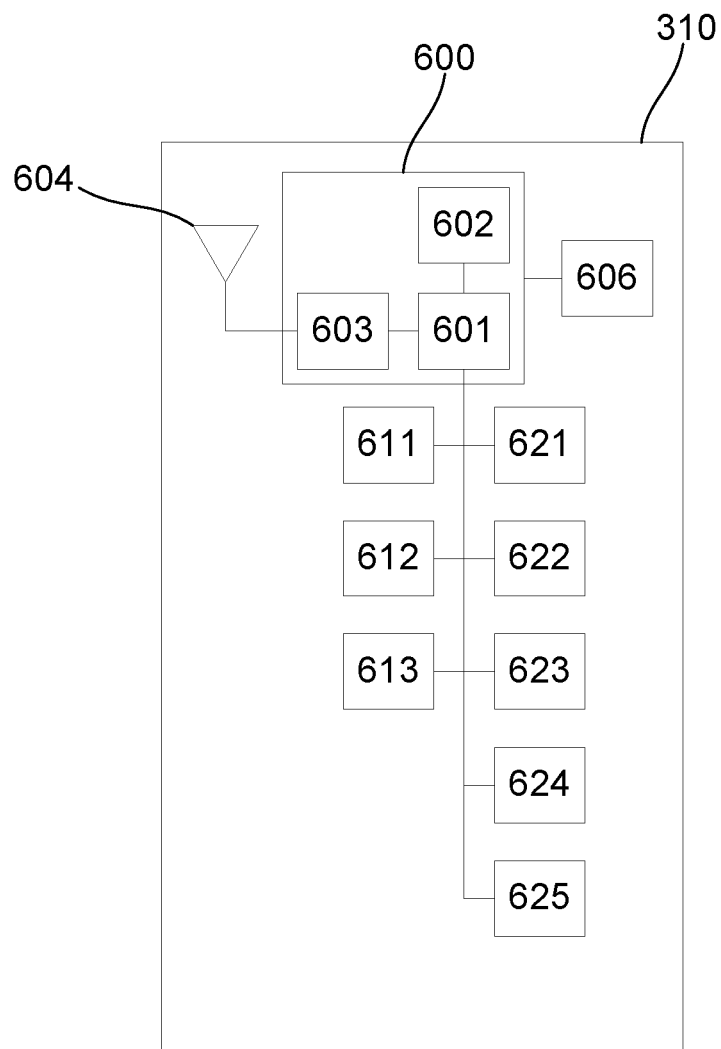
FIG. 6 is a schematic diagram of an example of a tag.

An example of a tag will now be described in more detail with reference to FIG. 6.

In this example, the tag 310 includes a power supply 606, a tag memory 602 that stores the object rules, a tag transceiver 603 that transmits or receives messages via an antenna 604, and a tag processing device 601 that identifies trigger events and causes the actions to be performed.

The nature of the tag and in particular the physical form factor of the tag, as well as the components used, can vary depending on the preferred implementation. For example, when the tag 310 utilises a short range wireless communications protocol, such as BLE, whilst the processing device 601 and transceiver 603 can be formed from a custom integrated circuit, such as a Bluetooth system on a chip (SOC), coupled to, or including an integrated antenna 604 and other optional components, such as the memory 602.

In one example, the processing device 601 executes applications software allowing desired processes to be performed. In one example, this can include implementing a scheduler, in order to control activities implemented by the tag, such as switching between awake and sleep modes, generating messages, or the like, whilst a virtual machine can be used to execute object rule code that embodies the respective object rules for the tag.

The power supply 606 is typically adapted to provide power to the transceiver 603 and processing device 601 allowing the tag 310 to communicate with the client device 320 and other tags 310. Whilst any appropriate power supply can be used, in one example the power supply is the form of "AAA" or button cell battery having a minimal volume form factor, allowing the tag to be manufactured with small physical dimensions. This enables the tag 310 to be easily and unobtrusively attached to or otherwise physically associated with objects. It will also be appreciated that in some circumstances, the power supply can include power generating components, such as a solar panel, or the like.

The tag 310 may also typically include one or more output devices, such as a speaker 611, LED 612 and signal generator 613, although other displays could be provided such as OLED displays, e-Ink displays, or the like. Similarly, one or more sensors, can be provided such as a temperature sensor 621, humidity sensor 622, pressure sensor 623, light sensor 624, movement sensor 625, or the like.

Figure 7:
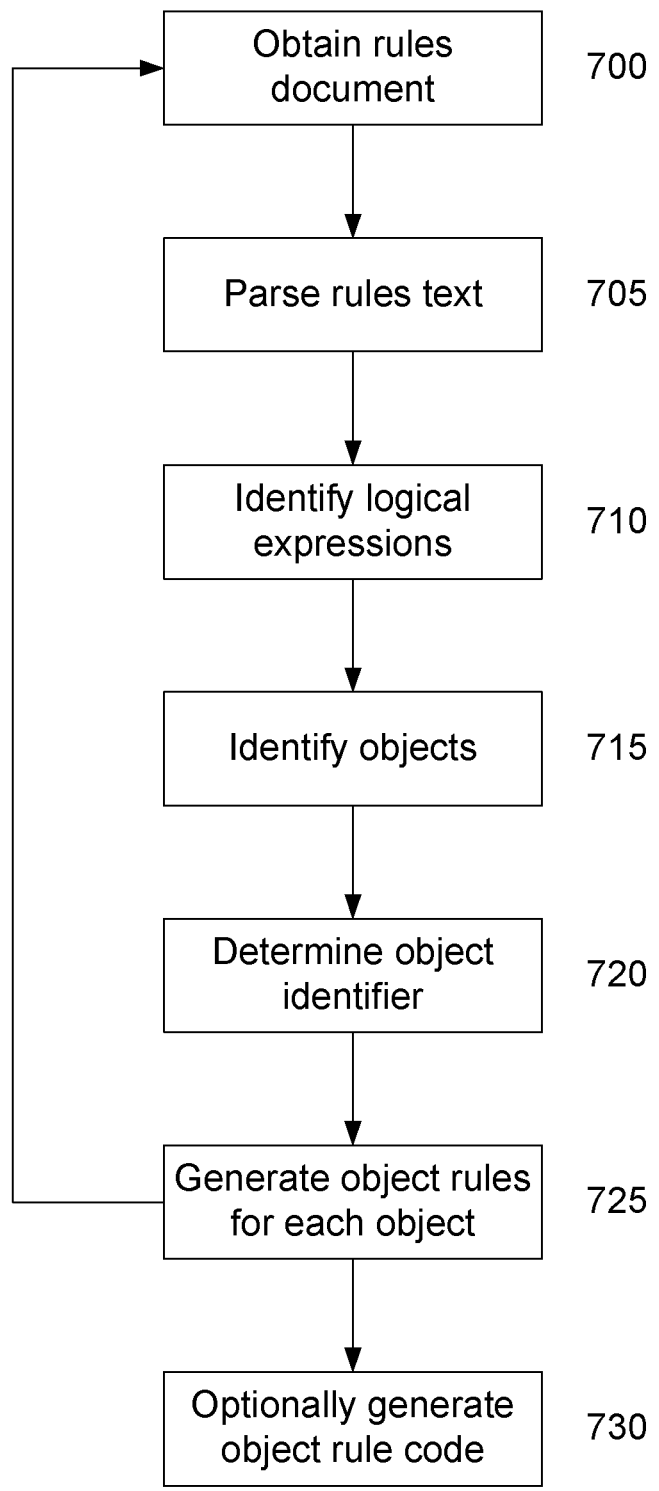
FIG. 7 is a flow chart of an example of a process for generating object rules.

In order to the system to operate, it is necessary for the system to be able to generate the object rules. Whilst this could be performed manually, as this would be an onerous task, in one preferred example a rules engine is used to assist in the object rule generation process, and an example of this will now be described with reference to FIG. 7.

For the purpose of this example, it is assumed that the rules engine is implemented by a server 330, although it will be appreciated that this is not essential, and alternatively the rules engine might be implemented using any suitable hardware device.

In this example, at step 700, the rules engine receives a rules document. The nature of the rules document and the manner in which this is received will vary depending on the preferred implementation. In one example, the rules document is in the form of a text document, which explains requirements relevant to objects of interest. This can be in the form of a compliance document, legal text, or the like, and the exact nature is not important for the purpose of this example. The document can be retrieved from a data store, received from another processing system, such as a client device, manually input, or the like.

At step 705, the rules engine parses the rules document and uses natural language processing to identify logic expressions at step 710 and object types at step 715. It will be appreciated that this can be performed by analysing the syntax of the document using known techniques and examples of these are described in co-pending applications PCT/AU2017/051175 (claiming priority from AU2016904359 filed on 26 Oct. 2016) and PCT/AU2017/051315 (claiming priority from AU2016905070 filed on 8 Dec. 2016), the contents of which are incorporated herein by cross reference.

For example, logic expressions are typically indicative of the rules that apply to the objects, and can be identified through the presence of "If . . . then . . . " type statements. Similarly objects can be identified by examining the document to identify subject—verb—object structures.

At step 720, the rules engine determines an object identifier for each object type, with this being used to generate object rules using the logic expressions. The object identifiers can be determined by retrieving these based on an object type of the object 101 or by generating these as needed.

At step 725, the rules engine generates the rules by converting the logic expressions into a trigger event and an action. In this regard, assuming the logic expressions are specified in terms of an "If . . . then . . . " statement, the "If" clause can be used to define trigger events with the "then" clause being used to identify the actions. For example, this can lead to rules of the form:

IF DISTANCE(GasBottle-H2, GasBottle-O2)<5 m THEN ANNOUNCE(A Hydrogen gas bottle and an Oxygen gas bottle must not be stored within 5 metres of each other")

In one particular example, the rules engine retrieves a rule template from a template repository and then populates this based on the logic expression in order to generate the object rule. The rules template can be used to ensure the rules are defined in a consistent manner, and to define standard actions, such as activating selected ones of the output devices 611, 612, 613. Thus, in this instance, a set template could be associated with audible or visual alerts, or the like, with the rules engine selecting a respective template depending on the nature of the action to be performed. Conditions associated with the trigger could also be defined in a similar manner. For example, if the logic expressions define a proximity boundary for two objects, the template could be used to create an additional buffer zone, so that a warning is generated prior to the proximity being breached.

It will be appreciated that the rules engine can also be configured to generate object rule code, in the form of snippets of byte code, which can be executed by tag processing devices 601 allowing the tag processing device 601 to implement the object rule, and in particular assess whether a trigger event has occurred, and if so, what action is required.

Figure 8:
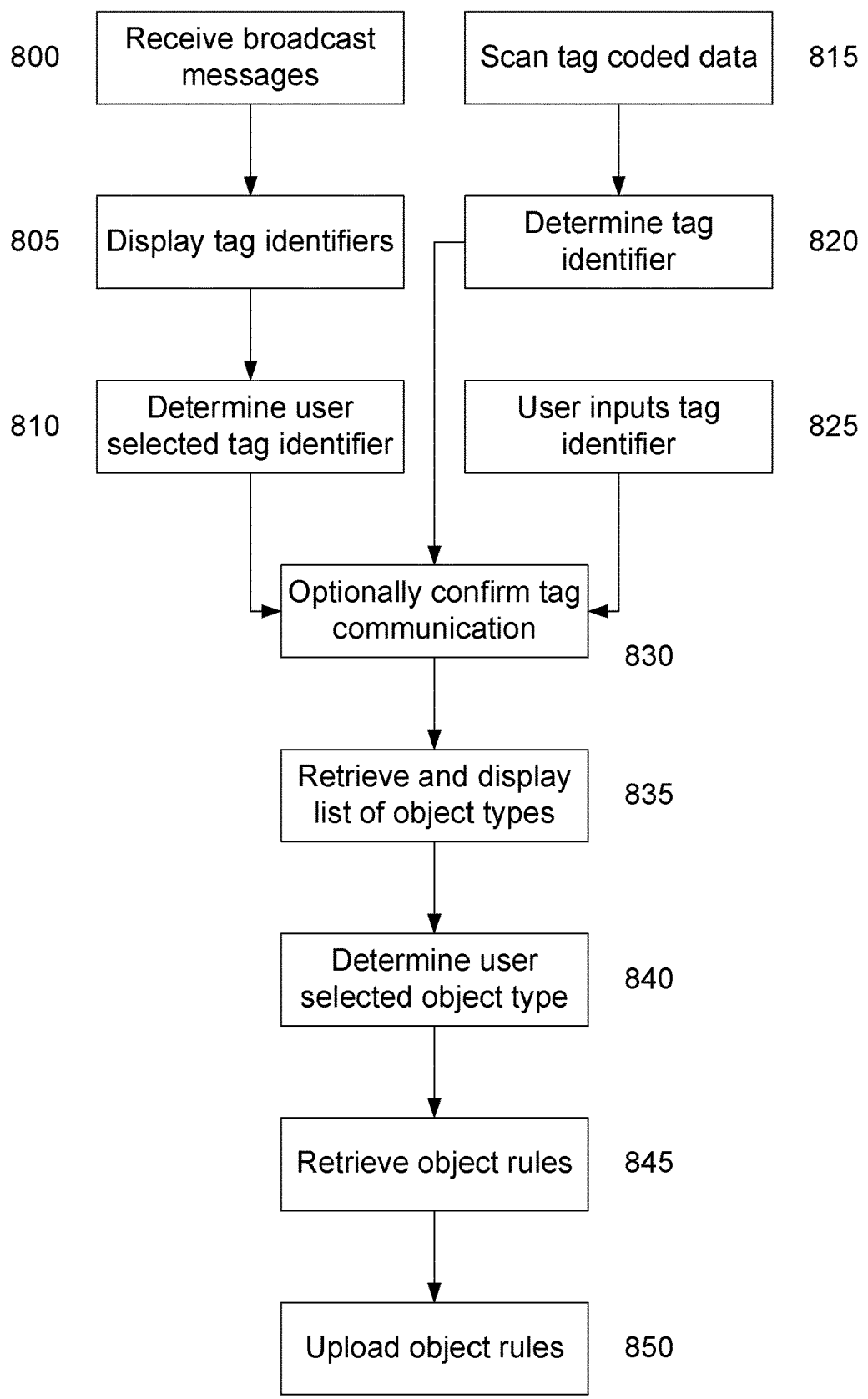
FIG. 8 is a flow chart of an example of a process for uploading object rules to a tag.

In order for the above described process to operate, it is preferable for a client device 320 to be able to communicate with the tags 310, specifically for the purpose of uploading object rules to the tags 310, but also further other purposes. An example of this process will now be described with reference to FIG. 8.

In order to be able to communicate with a tag 310, the client device 320 needs to be able to determine a tag identifier, which is a unique identifier that is assigned to each tag 310. This can be achieved in a number of different ways, depending on the preferred implementation. In each case, this typically involves having a user launch an application, which is used for interacting with the tags.

Following this, at step 800 the client device 320 operates to receive broadcast messages from a number of different tags that are located in the vicinity of the client device 320. It will be appreciated that this can be achieved simply by having the client device 320 operate in a listening mode for a set period of time, in a manner similar to the discovery operation used when pairing a Bluetooth device. The client device 320 can then display an indication of the tag identifiers associated with received tag messages, together with any other available information, such as an indication of the object types of objects with which tags are associated. This allows a user to select a tag identifier, to initiate communication with the tag 310.

In an alternative approach, the tags 310 might display visual or non-visual markings, which can be used to identify the tags. For example, the tag could include coded data, such as a QR code or similar, which can be scanned by the client device 320 at step 815, for example using a camera or other suitable mechanism, allowing the client device 320 to determine the tag identifier at step 820. A further alternative would be for the user to enter a tag identifier manually at step 825, for example if the identifier is displayed on the tag 310.

Once the tag identifier has been determined, an optional check can be performed at step 830, to ensure the correct tag 310 has been identified. In one example, this can be achieved by having the client device 320 transfer a message to the tag 310, using the tag identifier, with the message acting as a trigger to cause the tag 310 to generate an identifiable response, such as generating an audible tone, or activating a visual indicator, such as an LED. If the wrong tag has been identified, this process can be repeated as needed.

Having correctly identified the tag 310, communication can then be performed with the tag 310 as needed. For example, this could include transmitting messages to the tag to update the tag context, for example in the event that certain actions have been performed in respect of the object, such as completion of scheduled maintenance, or the like.

It will be appreciated that in one example, this can therefore be performed as part of a Bluetooth pairing process or similar, although this is not essential and will depend on the nature of the subsequent communication. For example in the case of uploading rules, a significant volume of data may need to be transferred in which case pairing may be worthwhile. However, in other scenarios, where a single message is transferred, this might not be required.

In the case of uploading object rules to the tag, at step 835, the client device 320 will typically retrieve and display a list of object types associated with the object rules stored in the repository. This allows the user to select an object type corresponding to the type of object with which the tag 310 is to be associated, enabling the client device 320 to determine a selected object type at step 840. The object type can then be used to allow rules to be retrieved from the rules repository at step 845, for example by requesting these from the server 330, with these then being uploaded to the tag 310 by the client device 320, at step 850, for example by having the client device generate one or more messages, which are transferred to the tag 310 in accordance with the tag identifier. In one example, such communication can be performed directly. Alternatively, the messages can be transferred to one or more of the location beacons 360, and then transferred to the relevant tag in accordance with the respective tag identifier.

Figure 9:
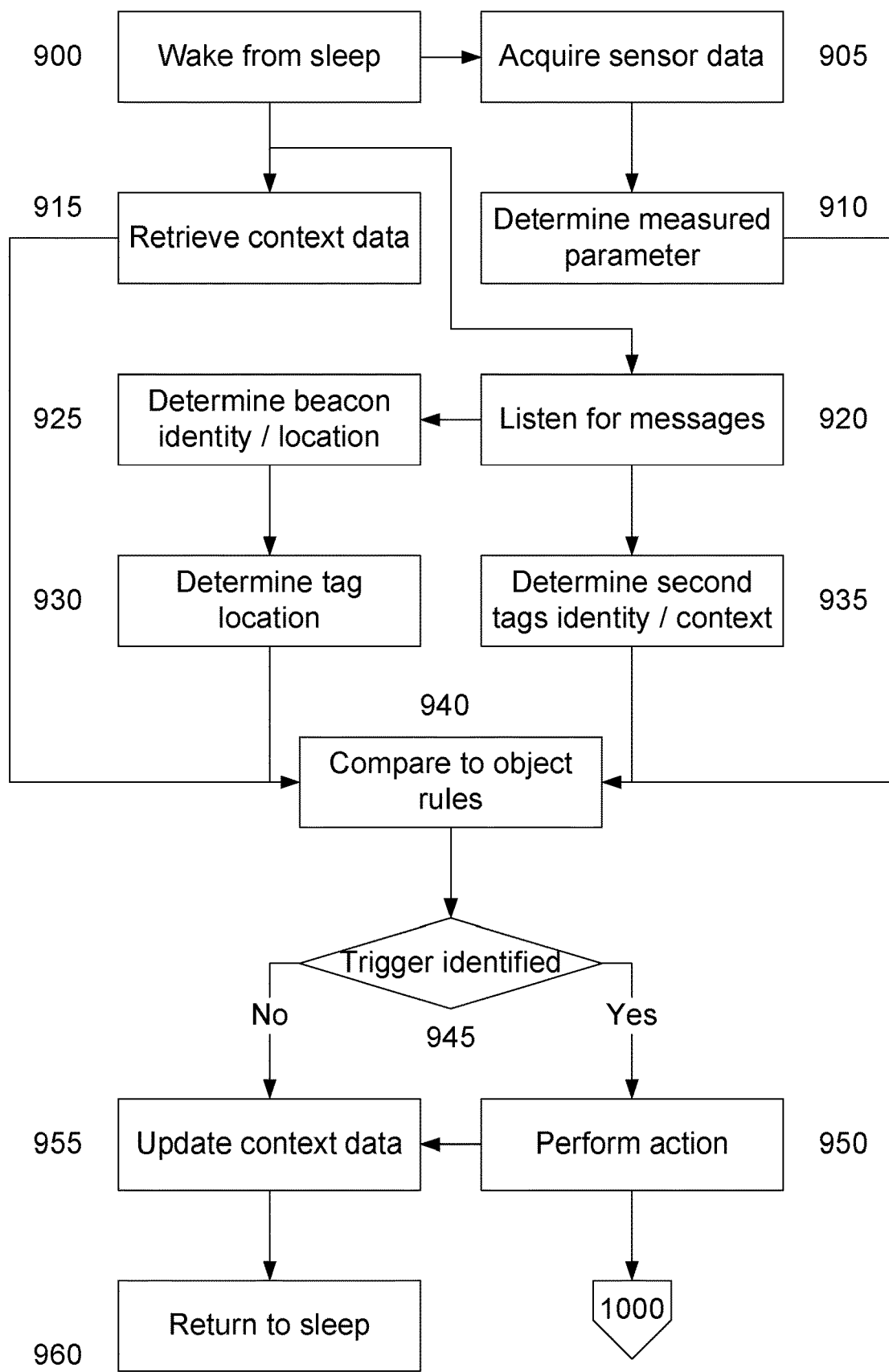
FIG. 9 is a flow chart of an example of a process for identifying a trigger; and, FIG. 10 is a flow chart of an example of a process for performing an action.

An example of a process for identifying a trigger event will now be described with reference to FIG. 9.

In this example, at step 900, the tag 310 wakes from sleep, either in accordance with a defined schedule, or upon detection of movement by the movement sensor 625. In simultaneous processes, the tag 310 will typically acquire sensor data at step 905, retrieve context data at step 915 and listen for messages at step 920. In this regard, sensor data acquired at step 905 is used to determine a measured parameter at step 910, such as a current temperature, humidity, air pressure, or the like. If messages are received at step 920, these typically include a location broadcast message, in which case the process involves determining a beacon identity and location from the location broadcast message at step 925, with this being used to determine a tag location at step 930. In the event that the message is a broadcast message from another tag, this is used to determine a second tag 310 identity and location, or other context, at step 935.

At step 940, each of the above determined context data, including the measured parameters, retrieved context data, current tag location and object identifier and context of other tags, are compared to the object rules, allowing one or more triggers to be identified at step 945. In this regard, the virtual machine implemented by the tag processing device 611 will execute each of the code snippets corresponding to the object rules for the tag, using the context data as variables, to thereby determine if the object rules are indicative of an event.

In this regard, it will be appreciated that analysing a range of different types of context data simultaneously, allows complex trigger events to be identified. For example, this could allow situations to be identified where an object is located within a set area, and is moving towards another object, and where an environmental parameter, such as a temperature, has been above a defined threshold for a defined time period. This in turn allows complex compliance or other object monitoring processes to be performed.

Figure 10:
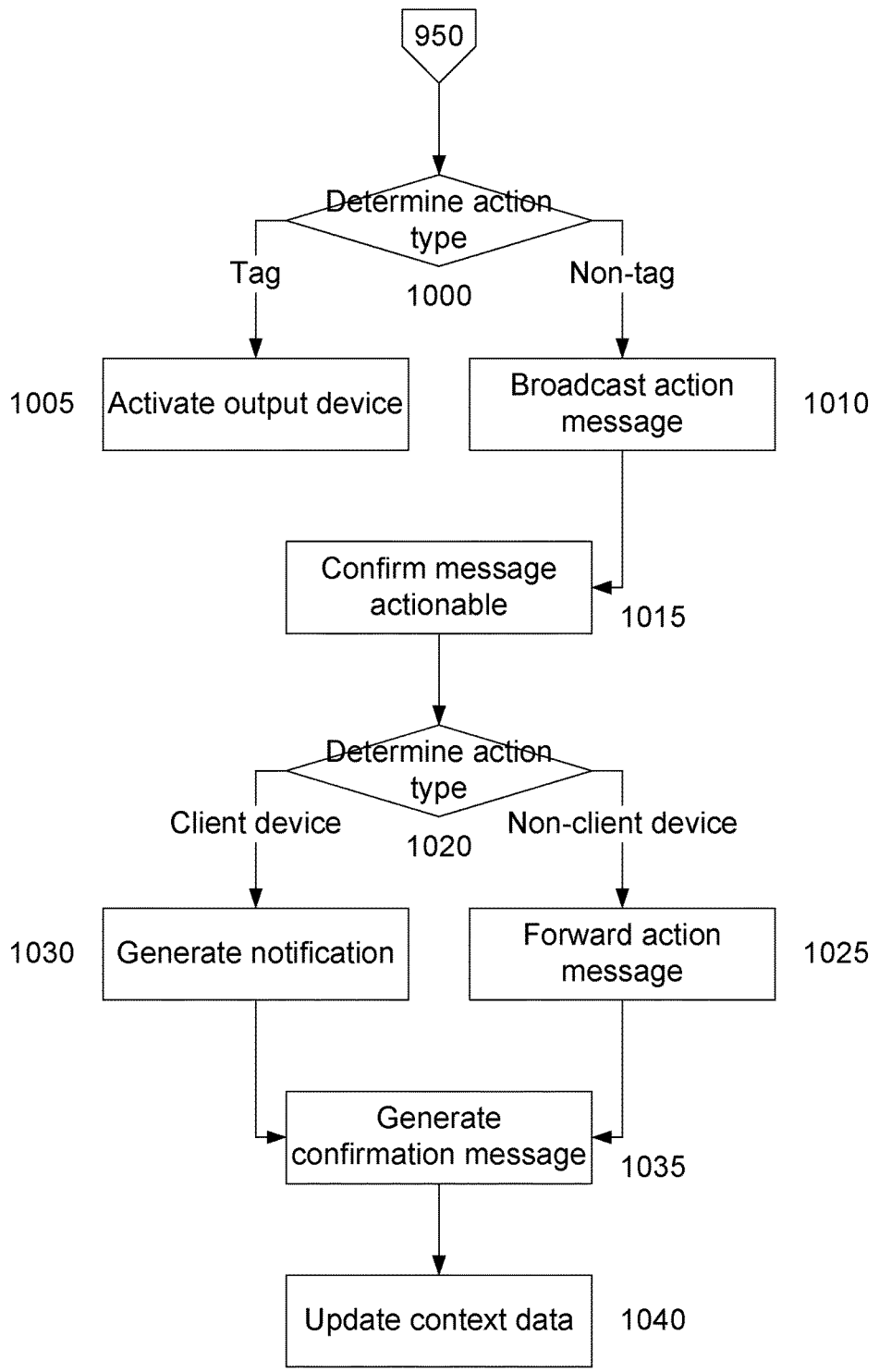

If a trigger is identified at step 945, the process proceeds to step 950 to cause an action to be performed, with an example of the action process being described below with reference to FIG. 10.

Following this or otherwise, context data is typically updated at step 955, for example to log details of measured parameters, the proximity of or movement relative to other tags, the current tag location, details of any identified trigger events, or performed actions, before the tag 310 returns to a sleep mode at step 960. The process of steps 900 to 960 would then be repeated after a predetermined time delay, which can be set based on the energy requirements of the tag.

An example of the process for performing an action will now be described with reference to FIG. 10.

In this example, at step 1000, the tag 310 determines if the action is to be performed by the tag and/or by another device, such as the client device 320. In the event that the action is performed by the tag 310, the tag 310 typically activates one or more of the output devices 611, 612, 613, for example to generate an audible and/or visual indication, or generate a control signal, which is sent to the object or other equipment as required by the defined action.

Additionally and/or alternatively, the action can involve another device, in which case the tag 310 generates and broadcasts an action message at step 1010. The format and content of the action message will typically be defined in the object rules and this could include, for example, defining the format and content of the action message, a message destination, or the like. The action message can be transferred directly to a client device, or could alternatively be transferred to a client device via a location beacon 360.

In this latter case, the tag processing device 611 will select a transmission slot, and broadcast an advert broadcast messages indicative of the selected slot. The tag processing device 611 will receive any advert broadcast messages transmitted by other tags, and use this to determine if the selected slot is available for transmission. Assuming so, the tag processing device 611 waits for a location broadcast message to be transmitted by the location beacon, and then transits the action message in the respective communication slot. Otherwise, the tag processing device 611 selects a different slot and repeats the process until a slot is available. Upon receipt of an action message, the beacon will determine an intended destination and forward the action message accordingly.

Assuming the action message is received by a client device 320, at step 1015, the client device 320 would confirm if the message is actionable. In particular, this step involves checking whether there are any settings that preclude the message being actioned, for example if a user has configured their client device 320 to block notifications, or the like.

Following this, at step 1020, it is determined if the action is to be performed by the client device 320 and/or another device, such as the server 330. For example, at step 1030, the client device can generate a notification, such as a visual and/or audible alert, which can be presented to a user. Additionally and/or alternatively, at step 1025 the client device 320 may forward the action message to another processing system, such as the server 330, which then performs the action as required.

In either case, a confirmation message can be generated by the client device 320 at step 1035, with this being provided to the tag based on a tag identifier included in the required action message, allowing the tag 310 to update the context data at step 1040, thereby reflecting that the action has been commenced and/or completed.

Accordingly, the above described system provides mechanisms in order to allow tags 310 to be used to monitor objects, causing trigger events to be identified based on a context of the tag, with actions being taken as required.

Specifically, the system provides a tag that can be attached to an object that in one example has the ability to localise itself, either absolutely, approximately or relative to other objects, and has one or more compliance rules relevant to the attached object that is assessed in the locally derived context, including the location, defined exclusion zones for the object, proximity to certain types of objects, environmental conditions unfit for the object, time of day, or the like. In one example, this can be used to determine if a compliance or other object rule has been breached and then perform a response to either indicate the breach, for example through notification such as a voice message detailing the breach to be actioned by an external party, or attempt to resolve the breach itself by effecting the object, such as having the tag control the object, disabling further movement of the object, such as shutting off power to a robot or vehicle, or the like.

In one example, the tag is aware of the type of object with which it is associated, and is able to advertise this information, optionally together with additional information, such as a location, range, or the like. The nature of the relevant object is then used to access object rules embodying complex legal or other compliance documents and frameworks, which can be transformed into a set of programmatically represented object rules, typically in the form of conditional statements that define triggers and associated actions. This allows the tag to be able to substantially continuously assess object rules using locally derived context information to detect a breach of one or more rules and hence perform one or more associated actions specific to the rule(s) being breached.

This can enable complex behaviours to be embodied within the rules, with the triggers being identified based on contextual information relating to the object, and other objects within the environment. For example, if the tag is assigned to a $H_2$ gas bottle, a rule can be defined that causes the tag to assess its own location and a location of any nearby $O_2$ gas bottles. If the rule is evaluated and a proximity restriction breached, then the rule will trigger a corresponding action, such as announcing using text to speech or pre-recorded speech, or displaying a visual indicator, that this object has breached the rule and an action needs to be taken.

This system can be applied to robotic applications; one example of this being giving the telepresence the ability to be able to localise itself and have one or more rules relating to breach of compliance based on proximity to other tags and/or locations. The tag could use map data in conjunction with components of rules and the rules that programmatically represent compliance, such as location, conditions relative to other objects, exclusion zones, floor maps, etc. These rules and compliances may be preloaded, dynamically loaded, or provided in near-real time by direct peer-to-peer communication with the tag. These give the robot the unique ability to understand that it may be in an area that it is not allowed and take appropriate action to deal with the situation, such as halting power to the robot so it remains there until someone comes and takes it out of the area.

In another example, equipment, such as a vehicle, tool, or the like, could be equipped with a tag defining rules regarding operating requirements associated with the equipment. The operating requirement could define exclusion zones around the equipment, information regarding authorised operators, or the like. In this instance, authorised operators could be provided with tags that provide permission for the user to use the machine. In the event that non-authorised users are detected within a defined proximity of the equipment, an alarm or notification could be generated.

Accordingly, the above described system enables low power cheap tags to be used to perform real-time in situ compliance checking and actioning by utilising a low power localisation engine and augmenting this with a compliance rule set specific to an object. The tag is in essence self-aware in that it knows what object it is attached to and thus is able to use the subset of compliance rule(s) that correspond to the object. Additionally, the device advertises properties of the object it is attached to so that tags associated with other objects can assess their rules in relation to the object.

The system can be used broadly for regulation technology applications in that it can notify when a breach of compliance policy occurs such as an object, including people, being in a restricted area, or relative to another certain type of object, plus the many other variations based on policy documents. However, numerous applications of general condition checking exist, such as providing notifications when immunodeficiency patients in an hospital are in too close of proximity, livestock venturing into restricted areas (i.e. outside of the designated paddocks), location-based sensor/kill switch if they enter an area they are not allowed in, staff who do not have qualification for using specific equipment or access to specific rooms.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. An object monitoring system including:
   a) a plurality of location beacons, each location beacon being configured to generate a location broadcast message indicative of a beacon location;
   b) a tag associated with a respective object in use, wherein the tag includes:
      i) a tag memory configured to store object rules;
      ii) a tag transceiver configured to transmit or receive messages;
      iii) a tag processing device configured to:
         (1) determine context data at least partially indicative of a tag context by:
            (a) using a received message, the received message including a broadcast message received from another tag, wherein a broadcast message is indicative of at least an object type identifier of the other tag, and at least one of:
(i) a tag location,
(ii) measured parameters; and
(iii) context data; and,
(b) at least one of:
(i) determining a tag location in accordance with at least one location broadcast message received via the tag transceiver from at least one of a plurality of location beacons; and,
(ii) using stored context data;
(2) use the object rules and the context data to identify a trigger event, wherein the object rules are stored in the tag memory as a plurality of executable byte code snippets, each snippet corresponding to a respective object rule, and wherein the tag processing device is configured to execute the snipes to identify if a trigger event has occurred;
(3) determine an action associated with the trigger event; and,
(4) cause the action to be performed.

2. A system according to claim 1, wherein the system includes:
a) a repository storing object rules for a plurality of object types; and,
b) a client device that communicates with the tag and the repository, and wherein in use object rules are uploaded from the repository to the tag using the client device based on an object type of the respective object.

3. A system according to claim 1, wherein at least one of:
(a) the object rules are uploaded to the tag via one or more of the plurality of location beacons;
b) a tag message is transferred to a client device via a location beacon; and
c) a client device message is transferred to a tag via a location beacon.

4. A system according to claim 1, wherein the client device includes at least one of:
a) one or more computer systems;
b) one or more smart phones;
c) one or more tablets; and,
d) one or more mobile computing devices.

5. A system according to claim 1, wherein the tag processing device is configured to determine the context data using at least one of:
a) a received message, including a client device message from a client device;
b) sensor data from at least one sensor; and,
c) user input commands.

6. A system according to claim 1, wherein at least one of:
a) the tag memory is configured to store stored context data indicative of at least one of:
i) an object history;
ii) an action history;
iii) a trigger history;
iv) a tag movement;
v) one or more measured parameters; and,
vi) an elapsed time period;
b) the tag processing device is configured to update stored context data in accordance with at least one of:
i) sensor data from at least one sensor;
ii) an identified trigger;
iii) an action performed; and,
iv) user input commands.

7. A system according to claim 1, wherein the tag processing device is configured to repeatedly execute the plurality of code snippets.

8. A system according to claim 1, wherein the tag includes an object identifier indicative of at least an object type of the associated objected wherein the object identifier includes:
a) a first identifier indicative of an object category; and
b) a second identifier indicative of an object sub-category.

9. A system according to claim 1, wherein the tag broadcast message includes a data packet including:
a) a packet header containing the object type identifier; and,
b) a payload containing the tag location.

10. A system according to claim 1, wherein the tag:
a) compares the tag location to location restrictions defined in the object rules for the respective object; and,
b) identifies a trigger event if the tag location breaches the location restrictions.

11. A system according to claim 1, wherein the tag is a first tag that:
a) uses a broadcast message received from at least one second tag associated with a second object to determine at least one second tag location indicative of a location of the at least one second tag;
b) determines a proximity of at least one second object using the at least one second tag location and a first tag location;
c) compares the proximity to proximity restrictions for the first and second objects defined in the object rules for the first object; and,
d) identifies a trigger event if the proximity breaches the proximity restrictions,
e) uses a broadcast message received from a second tag associated with a second object to determine a second tag location indicative of a location of the second tag; and,
f) determines a proximity of the second object using the second tag location and a first tag location.

12. A system according to claim 1, wherein the tag is a first tag that:
a) determines a second tag context using a broadcast message transmitted by a second tag associated with the second object;
b) determines a mutual context using the second tag context and a first tag context; and,
c) identifies a trigger event if the mutual context breaches the mutual context restrictions.

13. A system according to claim 1, wherein a client device:
a) determines a selected object type in accordance with user input commands; and,
b) generates a notification indicative of the tag location when a tag broadcast message having an object identifier of the selected object type is received.

14. A system according to claim 1, wherein the tag:
a) uses sensor data from at least one sensor to determine a measured parameter value; and,
b) identifies a trigger event if the measured parameter value breaches parameter value restrictions.

15. A system according to claim 1, wherein the action includes at least one of:
a) using a tag output device to at least one of:
i) at least partially control equipment;
ii) at least partially control the object; and,
iii) generate a notification;

b) transferring an action message to a client device, the client device being responsive to the action message to at least one of:
   i) generate a notification;
   ii) perform an action;
   iii) forward the action message to a defined destination; and,
   iv) cause an event log to be updated
c) alerting a user to a rule breach;
d) notifying a user of required maintenance;
e) deactivating the object; and
f) causing a transaction to be performed.

16. A system according to claim 1, wherein the tag includes at least one of:
a) an output device including at least one of:
   i) an audio output;
   ii) a light source; and,
   iii) a signal generator
b) a power supply;
c) an output device; and
d) at least one sensor.

17. A system according to claim 1, wherein at least one of:
a) the tag:
   i) repeatedly transmits broadcast messages separated by a transmission interval; and;
   ii) repeatedly listens for message over a listening interval greater than the transmission interval; and,
b) the tag:
   i) wakes from a sleep mode;
   ii) determines if a trigger event has occurred; and
c) if a trigger event has not occurred, returns to the sleep mode and wherein the tag is configured to wake from a sleep mode, and at least one of:
   i) in response to sensing of movement using a movement sensor; and
   ii) periodically.

18. A tag for use in an object monitoring system, the tag being associated with a respective object in use and including:
a) a tag memory configured to store object rules;
b) a tag transceiver configured to transmit or receive messages;
c) a tag processing device configured to:
   i) determine context data at least partially indicative of a tag context by
      (1) using a received message, the received message including a broadcast message received from another tag, wherein a broadcast message is indicative of at least an object type identifier of the other tag, and at least one of:
         a) a tag location;
         b) measured parameters; and,
         c) context data; and,
      (2) at least one of:
         a) determining a tag location in accordance with at least one location broadcast message received via the tag transceiver from at least one of a plurality of location beacons; and,
         b) using stored context data;
   ii) use the object rules and the context data to identify a trigger event, wherein the object rules are stored in the tag memory as a plurality of executable byte code snippets, each snippet corresponding to a respective object rule, and wherein the tag processing device is configured to execute the snippets to identify if a trigger event has occurred;
   iii) determine an action associated with the trigger event and,
   iv) cause the action to be performed.

19. A method for use in an object monitoring system, the object monitoring system including:
a) a plurality of location beacons, each location beacon being configured to generate a location broadcast message indicative of a beacon location;
b) a tag associated with a respective object in use, wherein the tag includes:
   i) a tag memory configured to store object rules;
   ii) a tag transceiver configured to transmit or receive messages; and,
   iii) a tag processing device, the method including, in the tag processing device:
      (4)
      (1) determining context data at least partially indicative of a tag context by:
         a) using a received message, the received message including a broadcast message received from another tag, wherein a broadcast message is indicative of at least an object type identifier of the other tag, and at least one of:
            i) a tag location;
            ii) measured parameters; and,
            iii) context data; and,
         b) at least one of:
            i) determining a tag location in accordance with at least one location broadcast message received via the tag transceiver from at least one of a plurality of location beacons; and,
            ii) using stored context data;
      (2) using the object rules and the context data to identify a trigger event, wherein the object rules are stored in the tag memory as a plurality of executable byte code snippets, each snippet corresponding to a respective object rule, and wherein the tag processing device is configured to execute the snippets to identify if a trigger event has occurred;
      (3) determining an action associated with the trigger event and,
      (4) causing the action to be performed.

20. A computer program product for use in an object monitoring system including:
a) a plurality of location beacons, each location beacon being configured to generate a location broadcast message indicative of a beacon location;
b) a tag associated with a respective object in use, wherein the tag includes:
   i) a tag memory configured to store object rules;
   ii) a tag transceiver configured to transmit or receive messages; and,
   iii) a tag processing device, the computer program product including computer executable code that when executed by the tag processing device, causes the tag processing device to:
      (1) determine context data at least partially indicative of a tag context by:
         a) using a received message, the received message including a broadcast message received from another tag, wherein a broadcast message is indicative of at least an object type identifier of the other tag, and at least one of:
            i) a tag location;
            ii) measured parameters; and,
            iii) context data; and, b) at least one of:
   i) determining a tag location in accordance with at least one location broadcast message received via the tag transceiver from at least one of a plurality of location beacons; and,
   ii) using stored context data;
(2) use the object rules and the context data to identify a trigger event, wherein the object rules are stored in the tag memory as a plurality of executable byte code snippets, each snippet corresponding to a respective object rule, and wherein the tag processing device is configured to execute the snippets to identify if a trigger event has occurred;
(3) determine an action associated with the trigger event; and,
(4) cause the action to be performed.

* * * * *